US009379542B2

United States Patent
Lovercheck et al.

(10) Patent No.: US 9,379,542 B2
(45) Date of Patent: Jun. 28, 2016

(54) SYSTEM FOR MULTIPLE INVERTER-DRIVEN LOADS

(71) Applicant: General Electric Company, Schenectady, NY (US)

(72) Inventors: Glenn T. Lovercheck, Erie, PA (US); Jeffrey Louis Daigle, Erie, PA (US); Rajeev Verma, Bangalore (IN); Emil N. Nikolov, Erie, PA (US)

(73) Assignee: General Electric Company, Schenectady, NY (US)

( * ) Notice: Subject to any disclaimer, the term of this patent is extended or adjusted under 35 U.S.C. 154(b) by 715 days.

(21) Appl. No.: 13/681,682

(22) Filed: Nov. 20, 2012

(65) Prior Publication Data

US 2014/0139016 A1 May 22, 2014

(51) Int. Cl.
| | |
|---|---|
| B60L 1/00 | (2006.01) |
| H02J 1/00 | (2006.01) |
| H02P 5/46 | (2006.01) |
| H02P 5/74 | (2006.01) |
| B60L 1/02 | (2006.01) |
| B60L 1/14 | (2006.01) |
| B60L 7/16 | (2006.01) |
| B60L 15/20 | (2006.01) |

(52) U.S. Cl.
CPC . *H02J 1/00* (2013.01); *B60L 1/003* (2013.01); *B60L 1/02* (2013.01); *B60L 1/14* (2013.01); *B60L 7/16* (2013.01); *B60L 15/2045* (2013.01); *H02P 5/46* (2013.01); *H02P 5/74* (2013.01); *B60L 2200/26* (2013.01); *Y02T 10/645* (2013.01); *Y02T 10/7283* (2013.01); *Y10T 307/461* (2015.04)

(58) Field of Classification Search
CPC ............. B60L 1/00; B60L 1/003; B60L 1/02; B60L 1/14; B60L 7/16; B60L 15/2045; H02J 1/00; H02P 5/46; H02P 5/74
See application file for complete search history.

(56) References Cited

U.S. PATENT DOCUMENTS 4,390,821 A * 6/1983 Krampe .................... H02P 1/54 318/60
5,352,965 A * 10/1994 Kawabata ............... B66C 13/22 212/285

(Continued)

FOREIGN PATENT DOCUMENTS

| EP | 2096748 A2 | 9/2009 |
| EP | 2256892 A1 | 12/2010 |
| JP | 0787614 A | 3/1995 |
| WO | 2005119895 A1 | 12/2005 |

OTHER PUBLICATIONS

International Search Report and Written Opinion issued in connection with corresponding PCT Application No. PCT/US2012/066521 on May 13, 2014.

*Primary Examiner* — Zeev V Kitov
(74) *Attorney, Agent, or Firm* — GE Global Patent Operation

(57) ABSTRACT

A system for controlling multiple inverter-driven loads includes a controller that is configured to be coupled with an inverter that receives direct current and converts the direct current into an alternating current in order to supply the alternating current to plural loads that are connected to the inverter by plural respective contactors. The controller also is configured to control operations of the inverter and of the contactors in order to individually control which of the loads remain connected to and powered by the inverter and which of the loads are disconnected from the inverter.

21 Claims, 11 Drawing Sheets

(56) References Cited

U.S. PATENT DOCUMENTS

| | | |
|---|---|---|
| 6,791,218 B1* | 9/2004 | Dragoi et al. .............. 310/68 B |
| 8,242,719 B2* | 8/2012 | Kubal et al. .................. 318/105 |
| 8,723,344 B1* | 5/2014 | Dierickx ..................... 290/1 R |
| 8,947,026 B2* | 2/2015 | Graner et al. ................ 318/152 |
| 2003/0123989 A1 | 7/2003 | Holden |
| 2006/0282565 A1* | 12/2006 | Kumaido ............ B62D 5/0493 710/41 |
| 2010/0013419 A1 | 1/2010 | White |

\* cited by examiner

SYSTEM FOR MULTIPLE INVERTER-DRIVEN LOADS

BACKGROUND

1. Technical Field

Embodiments of the subject matter described herein relate generally to systems that power inverter-driven loads. Other embodiments relate to systems for powering a vehicle.

2. Discussion of Art

One or more alternators may be joined with an engine of a powered vehicle to generate electric current. The current may be supplied to traction motors that provide the motive force that propels the vehicle, and to non-propulsion electric loads that do not propel the vehicle but provide other functions. Examples of non-propulsion electric loads include heating, ventilation, radial fans, air cooling (HVAC) subsystems, lights, electric circuits for personal use, and the like.

The non-propulsion electric loads may be powered by a head end power (HEP) system. Some HEP systems provide power to non-propulsion loads that operate on a fixed voltage and fixed frequency electric current. For example, some known non-propulsion loads that draw power from HEP systems run off of three phase alternating current having a voltage of 480 volts and a frequency of 60 Hz. The HEP systems may receive electric current for the non-propulsion electric loads from the tractive circuit in a transformed manner. For example, a transformer may inductively couple the tractive circuit with an auxiliary circuit that supplies the current to the non-propulsion electric loads. In addition to or as an alternative to the transformer, one or more boost choppers may be provided to increase the voltage on the tractive circuit to a larger voltage on the auxiliary circuit. One or more filters between the tractive and auxiliary circuits may be necessary to remove unwanted frequencies of the current before supplying the current to the non-propulsion loads.

The boost choppers and/or transformers increase or decrease the voltage supplied to the auxiliary circuit from the tractive circuit. The engines of some vehicles operate above a determined speed to ensure that sufficient torque is supplied to the alternator, and therefore sufficient voltage is supplied from the alternator to both the tractive circuit and the auxiliary circuit. For example, during motoring of the vehicle, the engine may operate above a first determined speed to ensure that sufficient voltage is generated and supplied to the tractive motors, and when the vehicle is idling the engine may still need to operate above a second determined speed to ensure that sufficient voltage is generated and supplied to the non-propulsion loads of the auxiliary circuit.

Some vehicles include two or more separate engines that power the tractive and auxiliary circuits. One engine causes an alternator to generate current for the tractive circuit, while another engine causes another alternator to create current for the auxiliary circuit.

It may be desirable to have a system that differs in function from those systems that are currently available.

BRIEF DESCRIPTION

In one embodiment, a system (e.g., a system for controlling multiple inverter-driven loads) includes a controller that is configured to be coupled with an inverter that receives direct current and converts the direct current into an alternating current in order to supply the alternating current to plural loads that are connected to the inverter by plural respective contactors. The controller also is configured to control operations of the inverter and of the contactors in order to individually control which of the loads remain connected to and powered by the inverter and which of the loads are disconnected from the inverter.

In one embodiment, a method (e.g., for controlling multiple inverter-driven loads) includes receiving direct current at an inverter, converting the direct current into an alternating current that is supplied to plural loads that are connected to the inverter by plural respective contactors, controlling operations of the inverter by at least one of deactivating the inverter or decreasing an operating speed of the inverter, and individually controlling which of the loads remain connected to and powered by the inverter and which of the loads are disconnected from the inverter by opening one or more of the contactors when the inverter is deactivated or the operating speed of the inverter is decreased.

In one embodiment, a system (e.g., for controlling multiple inverter-driven loads) includes an inverter, first and second contactors, and a controller. The inverter is configured to convert direct current into alternating current. The first and second contactors are configured to be connected with the inverter and to individually alternate between open and closed states. The first and second contactors are configured to conductively couple respective first and second loads with the inverter and to individually control supply of the alternating current to the first and second loads. The controller is configured to control the inverter and the first and second contactors in order to disconnect the first or second load from the inverter while the other of the first and second load remains connected to the inverter by at least one of decreasing an operating speed of the inverter or deactivating the inverter, and open the first or second contactor that is connected to the first or second load that is to be disconnected from the inverter while the other of the first and second contactor remains connected to the inverter.

In one embodiment, a system is provided that includes a single inverter coupleable to plural loads, and two or more of the plural loads have relatively differing power rating, voltage requirement, frequency, and/or control requirements.

In one embodiment, a system is provided that includes an alternator coupled to a compressor and further coupled to a first inverter driving at least one of a plurality of cooling fans.

In one embodiment, a vehicle has a first alternator that powers a traction bus and a second alternator that powers a head-end-power circuit. The vehicle further includes an inverter coupled to the second alternator; and a plurality of loads coupled to the inverter, wherein at least two of the loads have significantly differing load characteristics relative to each other.

DETAILED DESCRIPTION

Figure 1:
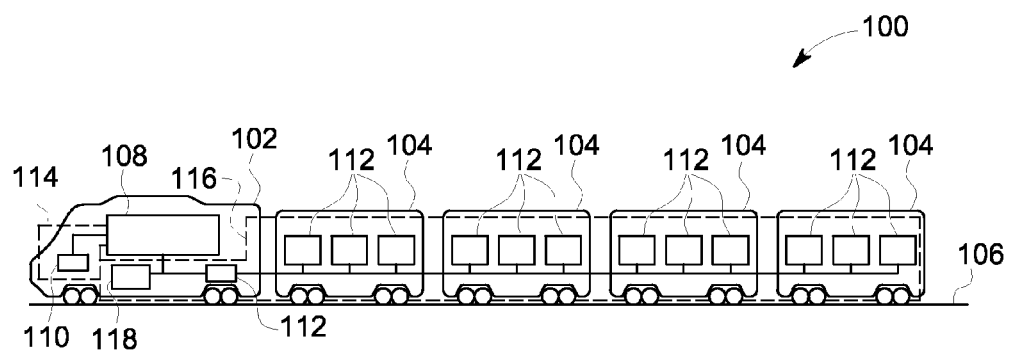
FIG. 1 is a diagram of a powered vehicle in accordance with one embodiment.

The subject matter described herein relates generally to a system that powers inverter-driven loads, and particularly to a system for powering a vehicle. In one embodiment, multiple loads are driven by a single inverter. Current sensors may be added to provide control and diagnostic feedback of the multiple loads. Contactors may be used between the inverter and some or all of the loads to provide the ability to disconnect some or all of the loads from the inverter as desired. This may be done as part of a control strategy, or to provide isolation of a load in the case of failure. Overload circuit breakers may be eliminated by incorporation of overload protection into the control strategy. Existing current sensor inputs originally intended for control of separate, independent inverters may be utilized as dual use inputs.

Fans and compressors may provide air for forced-air-cooled inverters, power electronics, and motors. These cooling air sources may be selected to meet noise requirements while still maintaining a determined air flow volume and/or rate, and each has associated a power demand or load. Such a load may be measured in horsepower (HP). These air sources may communicate with control diagnostics for the protection of electronic components and the like. To satisfy these requirements, high rates of change of frequency and voltage of the inverter output may be required. The controller of the inventive system accounts for mechanical fatigue of loads, thermal stress of electrical components, and the electrical capability of overload protectors and contactors.

Forced air cooling is provided for power electronics and motors by inverter driven blowers. A traction blower provides cooling air to the traction motors. The HEP blower provides cooling air to the HEP inverters as well as the HEP DC bus rectifiers, VSPD inverters, and other HEP compartment components. The control strategy required for each blower depends on the individual cooling needs of the devices in the air path of the blower. While traditionally only a single load or two similar loads with similar control requirements are driven from one inverter, embodiments of the inventive subject matter described herein may power (e.g., simultaneously power) multiple and dissimilar loads with a single inverter.

Noise requirements may challenge the use of blowers from being run at high speeds when a powered vehicle is in idle, particular if such a vehicle transports passengers. Such passengers may be exiting and entering the vehicle, and may be subject to the generated noise. Regardless of the desirability for low noise operation, components cooled by the HEP blower may require significant cooling regardless of the operating mode of the vehicles. In one embodiment, the traction motor blower is decoupled from the HEP motor blower.

For the following examples, the vehicle is described as a locomotive or other powered vehicle that is coupled to one or more non-self-powered units or cars. The term "non-self-powered units or cars" refers to a rail vehicle or other vehicle that is incapable of self-propulsion, but may otherwise include one or more loads that consume power (e.g., electric current) for one or more functions. The inventive system, however, has applicability to other vehicle types as well. Suitable other vehicles include mining equipment, busses, automobiles, marine vessels, and the like.

FIG. 1 is a diagram of a powered vehicle 100 in accordance with one embodiment. The vehicle 100 includes a lead powered unit 102 coupled with several trailing cars 104 that travel along a route 106, such as one or more rails of a track. In one embodiment, the lead powered unit 102 is a locomotive disposed at the front end of the vehicle 100 and the trailing cars 104 are passenger cars for carrying passengers and/or storage units for carrying goods along the route 106. The lead powered unit includes an engine 108 that is electrically coupled with propulsion electric loads, such as traction motors 110, that propel the vehicle. The engine may be an electric, diesel, steam, hydrogen, gas turbine powered engine, a hybrid of two or more engines that may be of differing types, or another device that generates energy to propel the vehicle 100. The propulsion electric loads of the lead powered unit may assist in propelling the vehicle. For example, the propulsion electric loads may include fans or blowers that cool the traction motors or to cool the power generation equipment that creates electric current based on movement of the engine 108, such as alternators and the like.

The lead powered unit and/or the trailing cars include one or more non-propulsion electric loads 112, 118 that also receive electric current from the engine 108. The non-propulsion electric loads do not propel (or assist other loads/components in propelling) the vehicle along the track. For example, the non-propulsion electric loads may provide services to persons in the lead powered unit and/or the passengers in the trailing cars. The non-propulsion electric loads may include one or more heating subsystems that heat the air in the lead powered unit and/or trailing cars, cooling subsystems that cool the air in the lead powered unit and/or trailing cars, ventilation subsystems that ventilate or move air in the lead powered unit and/or trailing cars, light sources that illuminate the interiors of the lead powered unit and/or trailing cars, batteries that store electric energy for backup or later use, hotel loads and telecommunication systems, and the like.

The vehicle may be referred to as a head end power (HEP)-based vehicle because the source of the electric power that is supplied to the non-propulsion electric loads is located in a powered unit, nominally at a head of the vehicle. This conventional nomenclature is designed to exemplify and not to limit the location of the power source. The engine provides mechanical energy that is converted into electric current to power the propulsion electric loads, such as the traction motors, and the non-propulsion electric loads. The electric current may be conveyed through a tractive circuit 114 and an auxiliary circuit 116. The tractive circuit 114 supplies power to the traction motors and other propulsion electric loads. The auxiliary circuit 116 supplies power to the non-propulsion electric loads.

The engine may operate at different speeds. For example, when the engine is moving along the path, the engine may operate at a higher speed, or revolutions per minute (rpm), than when the vehicle is stationary and the engine is operating at an idling speed. In accordance with one or more embodiments of the presently described subject matter, various power distribution systems are provided that supply approximately constant voltage to the auxiliary circuit regardless of the speed at which the activated engine is operating. For example, the frequency and/or magnitude of the voltage that is supplied to the auxiliary circuit may be controlled to be within a determined range, regardless of the speed at which the engine is operating as long as the engine is rotating at some non-zero frequency. By way of non-limiting example only, the determined range may be +/−10% of a determined voltage. Alternatively, different ranges such as +/−5%, 20%, or 25% may be used.

The current that is drawn by the propulsion electric loads and the non-propulsion electric loads may vary based on the number and types of traction motors and the non-propulsion electric loads that are turned on and drawing power. For example, the current may vary based on the power demand of the traction motors and the non-propulsion electric loads. The speed at which the engine operates may change based on the power demand. For example, as the power demand increases, the engine may speed up while the engine may slow down if the power demand decreases. In one embodiment, the engine may operate at a speed up to 1200 rpm when the power demand is relatively high and may operate down to a speed of 250 rpm when the power demand is relatively low. Naturally, operation speeds between 250 and 1200 rpm are possible, and the selection may be made with reference to operational efficiencies, engine performance levels, or other external factors.

By controlling the voltage that is supplied to the auxiliary circuit to be approximately constant even when the engine slows down to an idling speed, the engine may operate at slower speeds when the vehicle is not moving, such as when the vehicle is loading and/or unloading passengers. Reducing the speed at which the engine operates reduces acoustic noise of the engine and the amount of fuel consumed by the engine.

In one embodiment, the electric current and/or voltage is generated based on movement of the engine and is supplied to the tractive circuit and the auxiliary circuit in a non-transformed manner. For example, current and/or voltage may be supplied to each of the tractive and auxiliary circuits without passing the voltage and/or current through or across a transformer or chopper that connects or is disposed along a conductive pathway between the tractive and auxiliary circuits. By eliminating a transformer and/or chopper in the vehicle to transfer current between the circuits, the weight of the vehicle may be significantly reduced.

Figure 2:
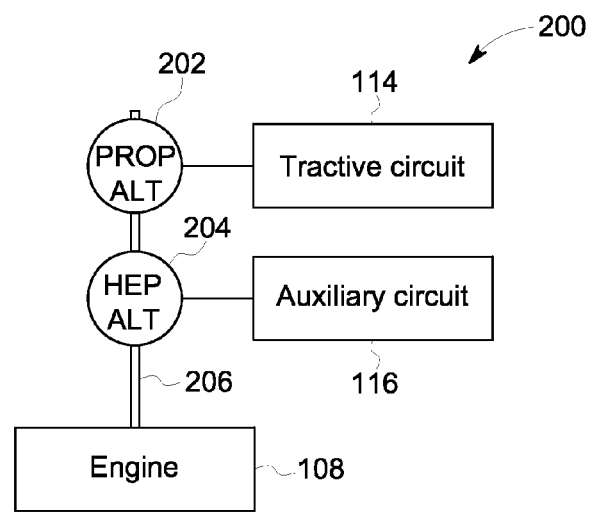
FIG. 2 is a diagram of a power distribution system of the vehicle shown in FIG. 1 in accordance with one embodiment.

FIG. 2 is a diagram of a power distribution system 200 of the vehicle in accordance with one embodiment. The power distribution system includes an alternator system having two or more alternators that are joined to the engine of the powered unit in the vehicle. The alternator system includes a propulsion alternator 202 ("PROP ALT") and a HEP alternator 204 ("HEP ALT"). In the illustrated embodiment, the propulsion and HEP alternators are coupled to a shaft 206 of the engine. Both of the alternators generate current based on common movement of the engine. For example, each of the alternators may include a rotor that is coupled to the shaft such that rotation of the shaft causes rotation of the rotors of each of the alternators. The engine moves or causes the shaft to rotate at an operating frequency. As the shaft rotates, the alternators each generate electric current, such as three-phase alternating current. While the alternators are described herein as generating three-phase alternating electric current based on movement of the engine, one or more of the alternators may be generators that create a different-numbered phase of alternating current or a direct electric current based on movement of the engine. (Thus, unless otherwise indicated through a more specific recitation of features, e.g., in the claims, the terms "alternator" and "generator" both refer generally to a device for converting mechanical energy, such as produced by the output shaft of an engine, to electrical energy.)

In the illustrated embodiment, the tractive and auxiliary circuits are electrically isolated/separated from each other. For example, the separate propulsion and HEP alternators provide electrical isolation between the tractive and auxiliary circuits such that electric current is not transferred or transmitted between the tractive and auxiliary circuits. As described above, both the propulsion and HEP alternators provide power for the respective tractive and auxiliary circuits without transmitting current between the tractive and auxiliary circuits, such as through a transformer or in a transformed manner. The absence of a transformer or chopper to convey current between the tractive and auxiliary circuits may reduce the overall weight of the vehicle relative to power distribution systems that include such a transformer.

The propulsion alternator is electrically coupled with the tractive circuit and the HEP alternator is electrically joined with the auxiliary circuit while the alternators and the circuits remain electrically separated or isolated from each other. For example, the alternators and circuits may remain separate such that electric current is not conveyed between the alternators or circuits, such as by a conductive pathway having a transformer and/or chopper. By way of example only, the circuits may be electrically isolated when there is no pathway between the circuits that transfers current by a conducting current in one circuit to the other circuit over a conductor. In another example, the circuits may be electrically isolated when there is no pathway between the circuits that transfers current by inductively conveying the current in one circuit to the other circuit. Electrical isolation or separation does not preclude the sharing of a common ground.

Figure 3:
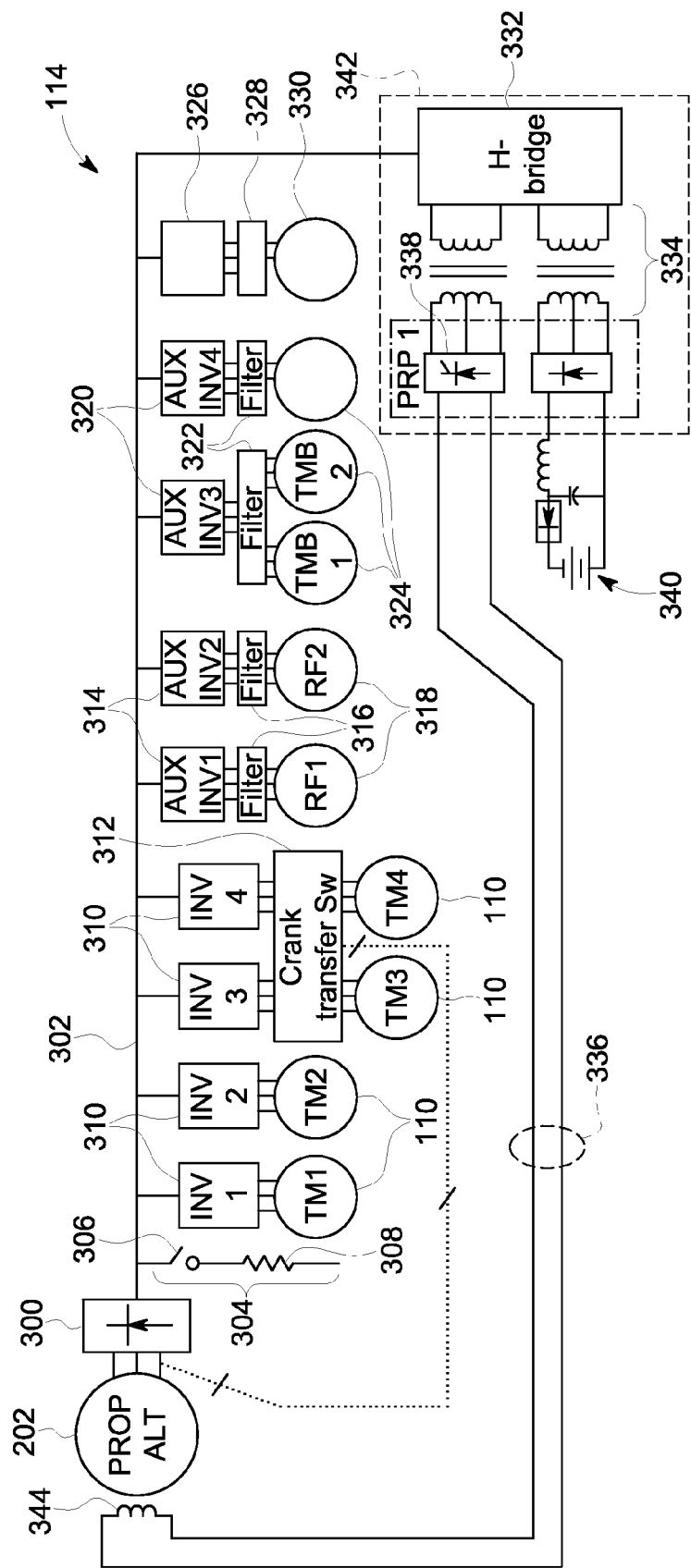
FIG. 3 is a circuit diagram of a tractive circuit of the power distribution system shown in FIG. 2 in accordance with one embodiment.

FIG. 3 is a circuit diagram of the tractive circuit in accordance with one embodiment. The propulsion alternator of the tractive circuit is coupled with the engine and provides a three phase alternating current to a rectifier 300. The alternating current may be based on movement of the engine. For example, the current that is output from the propulsion alternator may be based on the speed at which the engine is rotating the shaft and/or a field current of the propulsion alternator. The field current is an electric current that is applied to one or more field windings 344 of the propulsion alternator. The field current generates a magnetic field or flux of the propulsion alternator. A rotor of the propulsion alternator rotates within the magnetic field to generate the current and/or voltage that is output from the propulsion alternator.

Changing the speed of the engine varies the voltage that is created by the propulsion alternator. The output voltage from the propulsion alternator may increase when the engine increases the speed at which the shaft rotates or decrease as the engine slows down rotation of the shaft. The output voltage may be varied by changing the magnitude of the voltage in the field current. For example, increasing the voltage applied to the field windings 344 may increase the magnetic field created by the field windings 344 and the voltage that is output from the propulsion alternator while decreasing the voltage supplied to the field windings 344 decreases the output voltage.

The propulsion alternator generates current based on movement of the engine and the field current. The generated current is output from the propulsion alternator and is supplied to the rectifier 300. The rectifier converts the output current to a direct electric current that is conveyed through the tractive circuit along a bus 302. The bus may be referred to as a traction bus, since the bus conveys electric current through at least a portion of the tractive circuit. The tractive circuit includes several propulsion electric loads, such as the traction motors ("TM1", "TM2", "TM3", "TM4", and so on), fans 318 ("RF1", "RF2"), motor blowers 324 ("TMB 1", "TMB 2"), and the like. The propulsion electric loads described herein are not intended to be all encompassing or exclusive, as additional components may be included. Suitable bus voltage may be greater than 1200 volts, and may be less than 2200 volts. Suitable fans, such as radial fans, may provide a load and a corresponding output is in a range of from about 50 HP to about 100 HP.

In the illustrated embodiment, the propulsion electric loads include one or more grid resistor legs 304. The grid resistor legs 304 consume energy that is created when the vehicle brakes or slows down. For example, the brakes of the vehicle may be regenerative brakes that create electric current when the vehicle slows down. This current may be referred to as regenerated current. The regenerated current may be directed to the grid resistor legs where the current is converted into another energy form, such as heat. While only one grid resistor leg is shown, the tractive circuit may include several grid resistor legs, such as four or more grid resistor legs. The grid resistor leg includes a switch 306 and a resistive element 308. The switch 306 may be controlled to alternate between open and closed states to electrically couple and decouple, respectively, the resistive element with the bus. When the switch closes, at least some of the regenerated current is diverted to the resistive element. The switch may open to decouple the resistive element from the tractive circuit when the vehicle is moving along the path.

Inverters 310 (e.g., "INV 1", "INV 2", "INV 3", "INV 4") are coupled to the bus between the bus and the traction motors. The inverters 310 convert the direct electric current of the bus into an alternating current that is supplied to the traction motors of the propulsion electric loads. To prevent interruption of cooling air for excessive periods of time, and to allow a contactor to open under low load, suitable inverters may be selected with an ability to rapidly decelerate and accelerate the loads.

A crank transfer switch 312 ("Crank Transfer Sw") may be disposed between the inverters 310 and one or more fraction motors to control the supply of current to the traction motors during motoring and to supply the propulsion alternator with current during engine cranking.

Auxiliary inverters 314 ("Aux Inv1", "Aux Inv2") are coupled to the bus between the bus and filters 316. The auxiliary inverters 314 convert the direct current of the bus into an alternating current that is delivered to the filters. The filters reduce current that does not have a determined frequency or a frequency that falls outside a determined range of frequencies. Suitable filters can include one or more capacitors and reactors. The filters may filter out frequency components or harmonics of the alternating current that is output from the inverters 314. The alternating current that is output from the filters 316 is delivered to fans 318. The fans 318 may include radiator fans that blow air in the powered unit 102 (shown in FIG. 1). For example, the fans 318 may circulate air to cool a radiator or other component of the engine 108 (shown in FIG. 1).

Auxiliary inverters 320 ("Aux Inv3", "Aux Inv4") and filters 322 of the propulsion electric loads may be joined to the bus 302 to convert the direct current of the bus 302 into alternating current and to filter the current before the current is delivered to one or more traction motor blowers 324 ("TMB 1", "TMB 2"). The traction motor blowers 324 of the propulsion electric loads circulate air about or around the traction motors 110 to cool the traction motors 110. Additional inverters 326, filters 328, and/or other propulsion electric loads 330 may be joined to the bus 302 to draw current from the bus 302.

Suitable additional or other electric loads 330 may include fans, blowers, compressors, electronic devices, fraction motors, communication equipment, and the like.

The bus 302 is coupled with a field control component 342 of the tractive circuit 114. The field control component 342 is disposed between the field windings 344 of the propulsion alternator 202 and the propulsion electric loads of the tractive circuit 114, including the grid resistor legs 304, the traction motors 110, the fans 318, the blowers 324, and other loads 330. In the illustrated embodiment, the field control component 342 includes an H-bridge 332, a transformer 334, and a phase control rectifier 338 ("PRP1"). The transformer 334 is joined with a bus 336 that extends from the field windings of the propulsion alternator 202 to the transformer 334. The phase control rectifier 338 is disposed between the transformer 334 and the field windings of the propulsion alternator 202 along the bus 336.

An H bridge is an electronic circuit that enables a voltage to be applied across a load in either direction. In one embodiment, a dual H-bridge may be used.

The field control component 342 controls the field current that is supplied to the field windings 344 of the propulsion alternator 202. For example, the field control component 342 may change the voltage that is delivered to the field windings 344 in order to vary the magnetic field of the propulsion alternator 202. Changing the magnetic field of the propulsion alternator 202 may change the magnitude of the current, such as the voltage of the current, that is generated by the propulsion alternator 202 based on movement of the engine 108 (shown in FIG. 1).

The field control component 342 may change the voltage of the field current that is delivered to the field windings 344 based on the speed at which the engine 108 (shown in FIG. 1) operates. In one embodiment, the field control component 342 varies the voltage supplied to the field windings 344 in order to ensure that the voltage that is output from the propulsion alternator 202 is approximately constant. For example, the field control component 342 may increase the voltage of the field current when the engine 108 slows down and may decrease the voltage of the field current when the engine 108 speeds up. Varying the voltage of the field current may keep the voltage that is output from the propulsion alternator 202 within a determined range of voltages, or between upper and lower determined threshold voltages.

In the illustrated embodiment, an energy storage device 340, such as a battery, may be coupled with the field control component 342 and another phase control rectifier 342. The energy storage device 340 may receive and store electric current as a backup or emergency storage of electric power. The energy storage device 340 also may deliver electric current through the tractive circuit. For example, the energy storage device 340 may supply electric current when the engine 108 (shown in FIG. 1) is turned off or deactivated.

Figure 4:
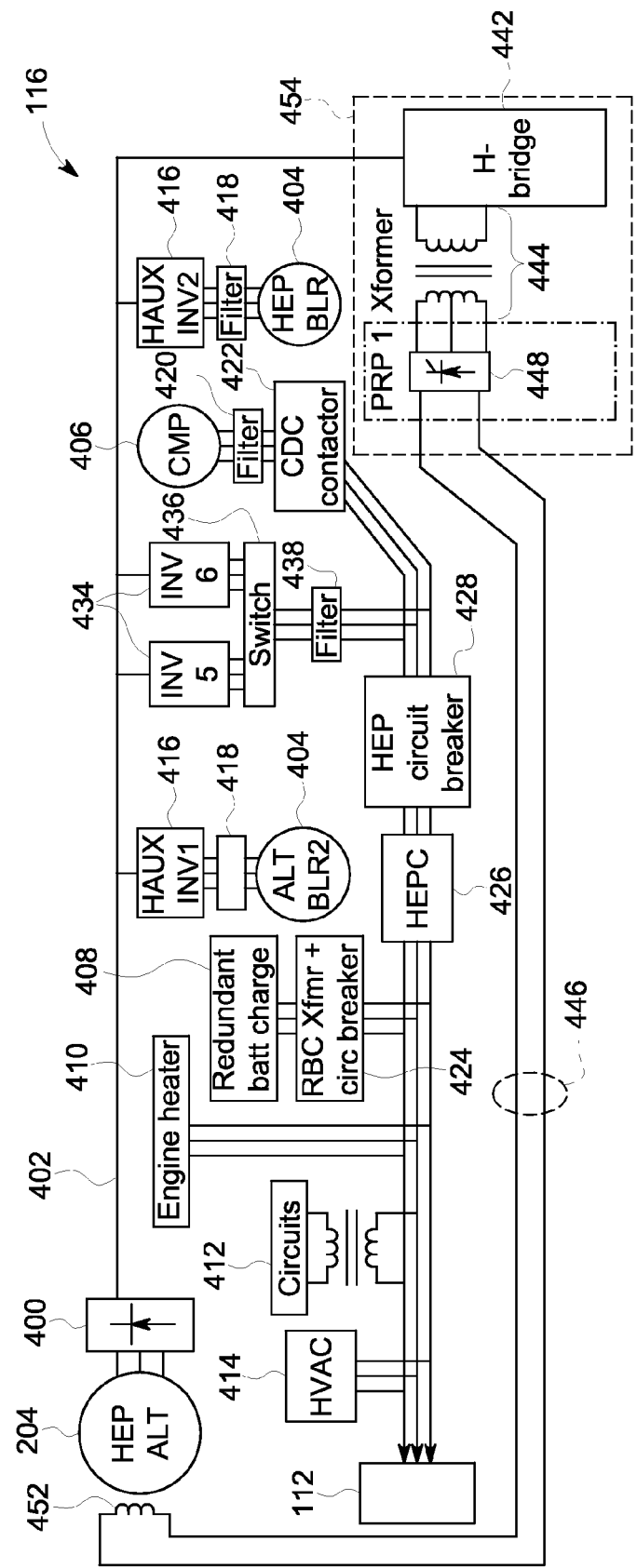
FIG. 4 is a circuit diagram of an auxiliary circuit of the power distribution system shown in FIG. 2 in accordance with one embodiment.

FIG. 4 is a circuit diagram of the auxiliary circuit 116 in accordance with one embodiment. The HEP alternator 204 ("HEP ALT") of the auxiliary circuit 116 may generate a three phase alternating current to a rectifier 400. As described above in connection with the propulsion alternator 202 shown in FIG. 2, the voltage and/or frequency of the alternating current may be based on the speed of movement of the engine 108 (shown in FIG. 1) and/or a field current supplied to one or more field windings 452 of the HEP alternator 204.

The shaft 206 (shown in FIG. 2) of the engine 108 (shown in FIG. 1) rotates and causes the HEP alternator 204 to generate an alternating current in one embodiment. The HEP alternator 204 provides the alternating current to the rectifier 400. The rectifier 400 converts the alternating current to a direct electric current that is conveyed through the auxiliary circuit 116 along a bus 402. The bus 402 may be referred to as an independent auxiliary bus, since the bus 402 is electrically separate or isolated from the tractive circuit 114 (shown in FIG. 1) in the illustrated embodiment.

The auxiliary circuit 116 includes several non-propulsion electric loads 112, 118 (shown in FIG. 1) that may be powered by electric current supplied by the HEP alternator 204. As described above, the non-propulsion electric loads 112, 118 may be located in one or more of the lead powered unit 102 (shown in FIG. 1) and/or the trailing cars 104 (shown in FIG. 1). In the illustrated embodiment, the non-propulsion electric loads 118 that are disposed in the lead powered unit 102 include a battery charger 408 ("Redundant Batt Charge"), electric circuits 412, a heating, ventilation, and air cooling ("HVAC") subsystem 414, blowers 404 ("Alt Blr2", "HEP Blr"), compressors 406 ("CMP"), and engine heaters or other layover protection equipment 410. Similar or different non-propulsion electric loads 112 may be included in one or more of the trailing cars 104. Alternatively, different non-propulsion electric loads 118, 112 may be provided.

In the illustrated embodiment, inverters 434 ("INV 5", "INV 6"), a switch 436, and a filter 438 couple the non-propulsion electric loads 112, 118 (shown in FIG. 1) with the auxiliary bus 402. The inverters 434 may convert a direct current on the bus 402 with an alternating current of a determined magnitude and frequency that is fed to the switch 436. By way of example only, the inverters 434 may convert the direct current of the bus 402 with a 450 to 500 volt, 60 Hz, multi-phase alternating current. Alternatively, the frequency of the current that is output from the inverters 434 may be a different frequency. For example, the output current from the inverters 434 may be less than 60 Hz. The switch 436 alternates between closed and open positions to alternatively couple and decouple the inverters 434 with the non-propulsion electric loads 112, 118. For example, the switch 436 may couple both inverters 434 in order to supply sufficient alternating current to the non-propulsion electric loads 112, 118. Multiple inverters 434 may be used in order to provide a backup or failsafe system. For example, if one inverter 434 fails, at least one additional inverter 434 may be available to supply the alternating current to one or more of the non-propulsion electric loads 112, 118. The filter 438 may filter out portions of the unwanted frequencies that are supplied from to the non-propulsion electric loads 112, 118, such as frequencies that are not a determined frequency, or waveforms that are distorted relative to a desired waveform.

A circuit breaker 428 is coupled to the filter 438. The circuit breaker 428 may include fuses that provide safeguards against overloading one or more components that are joined with the circuit breaker 428. For example, the circuit breaker 428 may include fuses that protect the battery charger 408, engine heater 410, circuits 412, HVAC subsystem 414, and the like, from voltage and/or current spikes. A contactor 426 ("HEPC") is located downstream from the circuit breaker 428 in the illustrated embodiment. The contactor 426 may be an electronically controlled relay or other switch disposed between the circuit breaker 428 and one or more of the non-propulsion electric loads 112, 118 (shown in FIG. 1). Similar to the switch 436, the contactor 426 may be controllable between closed and open positions to alternatively deliver and prevent delivery of current to one or more of the non-propulsion electric loads 112, 118.

The battery charger 408 may be an alternate or backup source of power for the non-propulsion electric loads 112, 118 (shown in FIG. 1). For example, the battery charger 408 may supply electric current to the HVAC subsystem 414 and circuits 412 if the HEP alternator 204 is unable to generate current for the auxiliary circuit 116. In one embodiment, an external source of power may be used to supply current to the battery charger 408 when the engine 108 (shown in FIG. 1) is turned off or is not moving. The battery charger 408 may be coupled with the bus by way of a transformer 424 ("RBC XFmr+Circ Breaker"). The transformer 424 provides electrical isolation of the auxiliary circuit 116 from the source of external power when the battery is being charged by the battery charger 408. The transformer 424 may include a circuit breaker or other protective equipment. The HVAC subsystem 414 provides ventilation to the lead powered unit 102 (shown in FIG. 1). In one embodiment, the HVAC subsystem 414 may include separate heating, cooling, and ventilation subsystems. Additional HVAC subsystems 414 may be provided in the trailing cars 104 (shown in FIG. 1) as the non-propulsion electric loads 118.

The electric circuits 412 may represent one or more circuits that supply current to the lead powered unit 102 (shown in FIG. 1). Additional electric circuits 412 may be included in the trailing cars 104 (shown in FIG. 1) as the non-propulsion electric loads 118 (shown in FIG. 1). For example, the circuits 412 may deliver current to electrical outlets and other interfaces that permit passengers to receive the current for devices of the passengers, such as electric razors, computers, and the like. One or more of the circuits 412 may include a light source that provides light in the trailing cars 104. The circuits 412 alternatively may supply current to one or more other devices or components than those described above.

The blowers 404 are coupled with inverters 416 ("HAux Inv1", "HAux Inv2") and filters 418. The inverters 416 convert the direct current into alternating current and the filters 418 filter the current prior to delivery of the current to the blowers 404. The blowers 404 may include fans that move air to cool a device, such as the inverters 416, 434, filters 438, a HEP field control component 454 of the auxiliary circuit 116. The compressor 406 may be an air compressor for a supplying compressed air for a braking system in the lead powered unit 102 (shown in FIG. 1) and/or the trailing cars 104 (shown in FIG. 1). As shown in FIG. 4, the compressor 406 may be coupled with a filter 420 and a contactor 422. The contactor 422 may be a switch that allows the compressor 406 to be coupled and decoupled from the auxiliary circuit 116. The filter 420 may filter the current supplied to the compressor The engine heater 410 includes a device that heats or warms the engine 108 (shown in FIG. 1) of the lead powered unit 102 (shown in FIG. 1). For example, the engine heater 410 may warm up an idle engine 108 in relatively cold environments prior to starting the engine 108. The engine heater 410 may be coupled with an external power source when the engine 108 is turned off in order to heat the engine 108.

The bus 402 is coupled with the HEP field control component 454. In the illustrated embodiment, the HEP field control component 454 includes an H-bridge 442, a transformer 444 ("Xformer"), and a phase control rectifier 448 ("PRP2"). The H-bridge 442 is joined with the transformer 444 and may include a circuit that allows the direct current to be applied across the transformer 444 in either direction. The transformer 444 is joined with a bus 446 that extends from the field windings of the HEP alternator 204 to the transformer 444. The phase control rectifier 448 is disposed between the transformer 444 and the field windings of the HEP alternator 204 along the bus 402.

The HEP field control component 454 controls the magnitude, or voltage, of the field current that is supplied to the field windings 452 of the HEP alternator 204. The HEP field control component 454 may increase or decrease the voltage of the field current in order to ensure that the HEP alternator 204 outputs an approximately constant voltage. For example, the HEP field control component 454 may change the voltage applied to the field windings 452 so that the voltage that is output from the HEP alternator 204 is independent of the speed at which the engine 108 (shown in FIG. 1) operates. As the engine 108 slows down, the HEP field control component 454 increases the magnitude, or voltage, of the field current so that the voltage generated by the HEP alternator 204 does not decrease and remains within a determined range of voltages, or between upper and lower threshold voltages. As a result, the engine 108 may be able to operate at a lower speed and generate less acoustic noise while the auxiliary circuit 116 receives sufficient voltage to power the non-propulsion electric loads 112, 118 (shown in FIG. 1). Conversely, as the engine 108 speeds up, the HEP field control component 454 decreases the voltage of the field current so that the voltage generated by the HEP alternator 204 does not fall outside of the determined range of voltages. By way of example only, the HEP field control component 454 may change the voltage supplied to the field windings 452 such that the voltage generated by the HEP alternator 204 does not fall outside of the range of 750 to 850 volts when the engine 108 is operating.

The voltage on the bus 402 that is regulated by the field control component 454 and that is supplied to the field windings 452 may be controlled by the field control component 454 to be at least as great as, but not significantly larger than, a threshold voltage that is demanded by the auxiliary circuit 116. The field control component 454 may reduce or regulate the voltage to be approximately the same as the voltage demanded by the non-propulsion electric loads 112, 118 (shown in FIG. 1). For example, the field control component 454 may reduce the voltage on the bus 402 to be as low as possible while still being large enough to power the non-propulsion loads 112, 118 of the auxiliary circuit 116. Reducing the voltage on the bus 402 to be just large enough to meet the power demands of the auxiliary circuit 116 may decrease the filtering requirements of the filter 438 and/or to reduce power dissipation losses in the inverters 434. For example, without a significant excess voltage that exceeds the power demanded by the auxiliary circuit 116, smaller filters 438 and/or inverters 434 may be used to meet the filtering requirements and loss limitations of the auxiliary circuit 116. Additionally, smaller filters 438 and/or inverters 434 typically generate less heat than larger filters 438 and/or inverters 434. As a result, the blower 404 may need to pass less air over the filter 438 and/or inverters 434 to cool the filter 438 and/or inverters 434.

Figure 5:
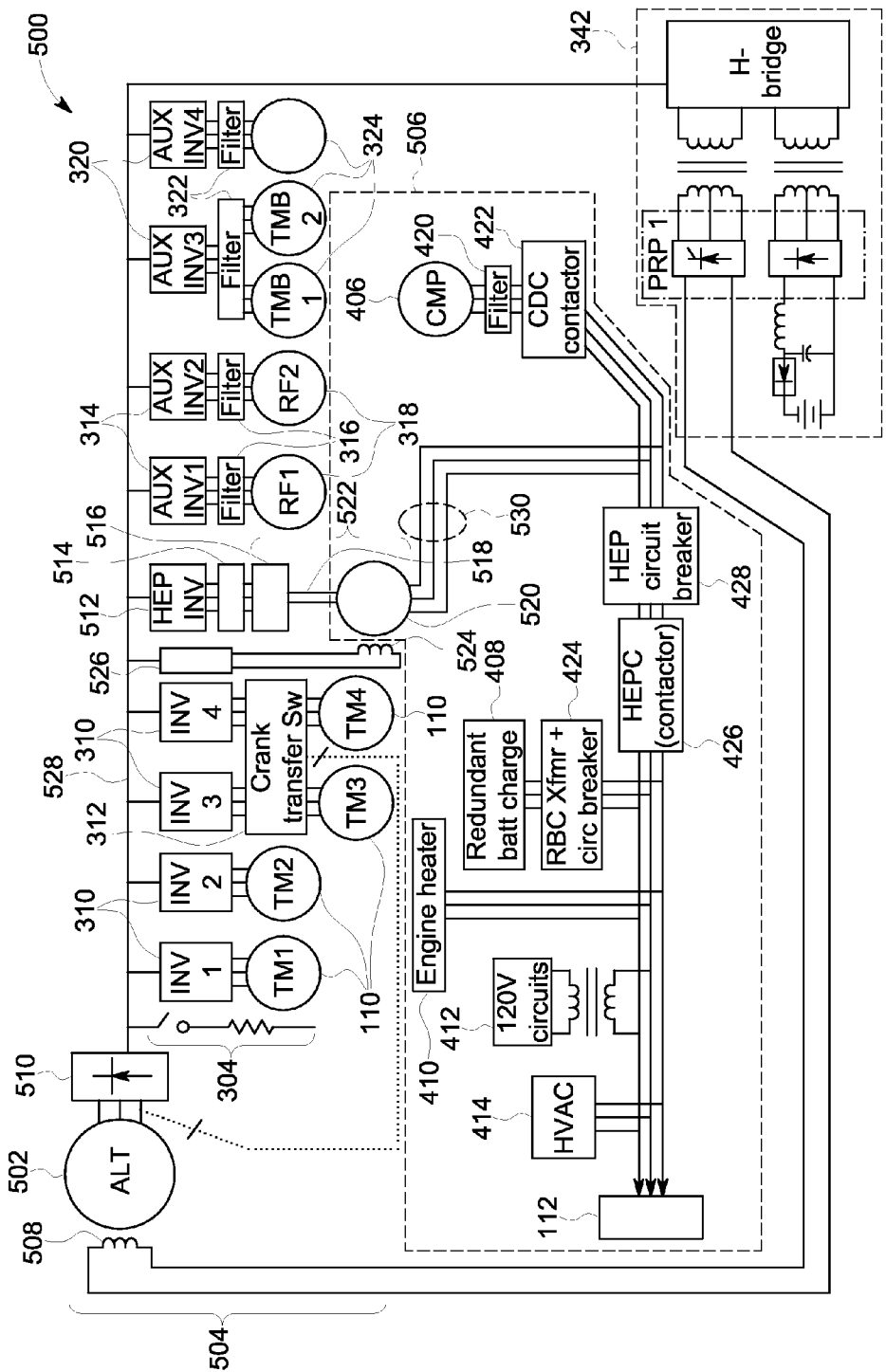
FIG. 5 is a diagram of an auxiliary circuit of the power distribution system shown in FIG. 2 in accordance with another embodiment.

FIG. 5 is a diagram of a power distribution system 500 in accordance with another embodiment. The system 500 distributes current to propulsion electric loads and non-propulsion electric loads 112, 118 (shown in FIG. 1) of the rail vehicle 100 (shown in FIG. 1) from an alternator 502 ("ALT") that is joined to the engine 108 (shown in FIG. 1). In one embodiment, the system 500 may include a single alternator 502 that is coupled to the shaft 206 (shown in FIG. 2) of the engine 108 and that generates current for both a tractive circuit 504 and an auxiliary circuit 506, as opposed to multiple alternators that separately produce current for tractive and auxiliary circuits. Alternatively, the system 500 may include multiple alternators 502.

As the engine 108 (shown in FIG. 1) rotates the shaft 206 (shown in FIG. 2), the alternator 502 creates electric current that is based on the speed at which the engine 108 rotates the shaft 206 and the field current that is supplied to field windings 508 of the alternator 502. As described above, when the engine 108 operates at faster speeds and/or greater voltages that are applied to the field windings 508 may result in larger voltages being produced by the alternator 502. For example, the voltage created by the alternator 502 may increase with faster engine 108 speeds and/or increasing voltages of the field current. Conversely, slower engine 108 speeds and/or lower voltages of field currents may result in smaller voltages produced by the alternator 502.

In the illustrated embodiment, the alternator 502 generates an alternating current that is supplied to a rectifier 510. Similar to as described above in connection with the tractive circuit 114 (shown in FIG. 1), the rectifier 510 converts the alternating current into a direct current. The direct current is supplied to a bus 528 of the tractive circuit 504 that delivers the current to various propulsion electric loads of the tractive circuit 504, including grid resistor legs 304, inverters 310, 314, 320, traction motors 110, switches 312, filters 316, 322, fans 318, blowers 324, field control component 342, and the like. The bus 528 may be similar to the bus 302 (shown in FIG. 3) of the tractive circuit 114. As described above, the current is delivered to the propulsion electric loads of the tractive circuit 504 along the bus in order to propel the rail vehicle 100 (shown in FIG. 1) along the route and perform other functions involved with propelling the vehicle 100.

A HEP inverter 512 ("HEP INV") is coupled with the bus of the tractive circuit 504. The HEP inverter 512 converts the direct current on the bus to alternating current that is fed to a contactor 514. The contactor 514 is a switch that allows the auxiliary circuit 506 to be coupled and decoupled from the tractive circuit 504. While only one HEP inverter 512 and a single contactor 514 are shown, alternatively multiple HEP inverters 512 and/or contactors 514 may be provided. The current on the tractive circuit 504 is supplied to a HEP motor-generator set 522 of the auxiliary circuit 506. The current powers a HEP motor 516 of the HEP motor-generator set 522 to rotate or move a shaft 518. In one embodiment, the HEP motor 516 rotates the shaft 518 at an approximately constant speed or frequency, or at a speed or frequency that is independent of the speed or frequency at which the engine 108 (shown in FIG. 1) is turned on and operating. For example, the HEP motor 516 may operate at an approximately constant speed while the speed of the engine 108 may vary. The HEP motor 516 may rotate the shaft 518 at a speed that falls within a determined range of speeds, or between upper and lower determined speed thresholds. By way of example only, the determined range of speeds may be between +/−5%, 10%, 20% or some other percentage of a determined speed.

A HEP generator 520 of the HEP motor-generator set 522 is coupled to the HEP motor 516 and generates current based on movement of the HEP motor 516. For example, the HEP generator 520 may be joined to the shaft 518 and may create electric current based on rotation of the shaft 518 by the HEP motor 516. As shown in FIG. 5, the HEP motor-generator set 522 provides electric isolation between the tractive and auxiliary circuits 504, 506. For example, the HEP motor-generator set 522 may joined to and extend between the tractive and auxiliary circuits 504, 506 but may not provide a conductive pathway that transfers electric current from the tractive circuit 504 to the auxiliary circuit 506, and vice-versa.

In one embodiment, the HEP motor-generator set 522 is configured to rotate the shaft 518 at speeds that are faster than the speeds at which the engine 108 (shown in FIG. 1) is capable of operating. For example, the HEP motor-generator set 522 may be capable of operating at a speed of between 3500 and 3700 rpm while the engine 108 may be limited to operating at a speed of approximately 1000 rpm or less. Alternatively, the HEP motor 516 rotates the shaft 518 at a different speed, such as between 1700 and 1900 rpm. Providing a HEP motor-generator 522 that is capable of operating at higher speeds than the engine 108 may allow for a smaller and/or lighter HEP motor-generator 522 to be used when compared to motors and generators that are incapable of operating at such higher speeds.

The HEP generator 520 has a magnetic field through which a rotor winding moves based on rotation of the shaft 518 in order to create an electric current that is output from the HEP generator 520. In the illustrated embodiment, the HEP generator 520 includes field windings 524 that generate the magnetic field. The field windings 524 are joined with the bus 528 by a field control component 526. The field control component 526 may be similar to the field control component 342 or 454 (shown in FIGS. 3 and 4). The field control component 526 receives direct current from the bus 528 and varies the voltage and/or the frequency of the field current that is supplied to the field windings 524. In another embodiment, the field windings 524 may be coupled to a power source, such as a battery, that provides the field current to the field windings 524. Alternatively, the HEP generator 520 may include a permanent magnet that provides the magnetic field.

The HEP generator 520 provides an alternating current to a bus 530 of the auxiliary circuit 506. For example, the HEP generator 520 may include multiple windings around the stator of the HEP generator 520 such that an alternating current is produced when the rotor of the HEP generator 520 rotates within the magnetic field of the HEP generator 520 due to rotation of the shaft 518. In one embodiment, the HEP generator 520 produces a three phase, 60 Hz alternating current based on rotation of the shaft 518. Alternatively, a different phase and/or frequency of alternating current may be generated. For example, the HEP generator 520 may produce a lower frequency current. The HEP generator 520 may include a different number of windings in the stator of the HEP generator 520 to produce a different voltage and/or phase of alternating current.

While only a single HEP generator 520 is shown in FIG. 5, alternatively, multiple HEP generators 520 may be coupled with the shaft 518. Different HEP generators 520 may produce currents having different frequencies and/or phases. For example, a first HEP generator 520 joined to the shaft 518 may be configured to produce current having a first frequency and/or phase while a second HEP generator 520 joined to the shaft 518 may be configured to produce current having a different second frequency and/or phase based on common movement of the shaft 518. The field current supplied to the field windings 524 may be changed based on the frequency and/or power demands of the auxiliary circuit 506. The current that is created by the HEP generator 520 is supplied to the non-propulsion electric loads 112, 118 (shown in FIG. 1) of the auxiliary circuit 506, including the compressor 406, filter 420, contactors 422, 426, circuit breaker 428, battery charger 408, electric circuits 412, HVAC subsystem 414, and other electric loads 118 in the trailing cars 104 (shown in FIG. 1).

In operation, the alternator 502 provides the current that powers the propulsion electric loads of the tractive circuit 504 to propel the vehicle 100. This current also powers the HEP motor-generator set 522 to provide current for the auxiliary circuit 506. The HEP motor 516 may rotate the shaft 518 at a determined speed so that the HEP generator 520 produces an output current having a determined frequency, such as 60 Hz. Alternatively, the HEP motor 516 may increase the speed at which the shaft 518 is rotated to increase the frequency of the output current or may decrease the speed at which the shaft 518 is rotated to decrease the frequency of the output current.

The voltage of the output current from the HEP motor-generator set 522 is based on the voltage of the field current that is supplied to the field windings 524. The voltage of the field current may vary based on the power demand of the auxiliary circuit 506. For example, as the power demanded by the non-propulsion electric loads 112, 118 (shown in FIG. 1) of the auxiliary circuit 506 increases, the voltage applied to the field windings 524 may be increased. Conversely, as the power demanded by the non-propulsion electric loads 112, 118 decreases, the voltage applied to the field windings 524 may decrease.

If the power demand of the auxiliary circuit 506 is relatively low, the voltage supplied to the motor 516 may vary between relatively high and low voltages because the HEP motor 516 is permitted to operate at relatively low or high voltage. For example, if the power demand of the auxiliary circuit 506 is low, then the HEP motor 516 may operate at a low or high voltage while still providing predetermined speed of operation to HEP generator 520 and thus providing constant voltage and frequency for the non-propulsion loads 112, 118 (shown in FIG. 1).

The HEP motor 516 may operate at relatively high voltage to produce sufficient current and/or voltage to the auxiliary circuit 506 even when the engine 108 (shown in FIG. 1) operates at relatively slow speeds or at maximum or relatively fast speeds of the engine 108. In one embodiment, the HEP motor 516 is configured to rotate at higher speeds than the engine 108. Since the speed of the motor generator set is much larger, the size and weight of the motor generator set can be reduced.

In one embodiment, the vehicle 100 (shown in FIG. 1) may include a regenerative braking system that creates current when the vehicle 100 slows down or brakes. The regenerated current may be delivered to the HEP motor-generator set 522 by way of the HEP inverter 512 as the voltage that is input to the HEP motor 516.

Figure 6:
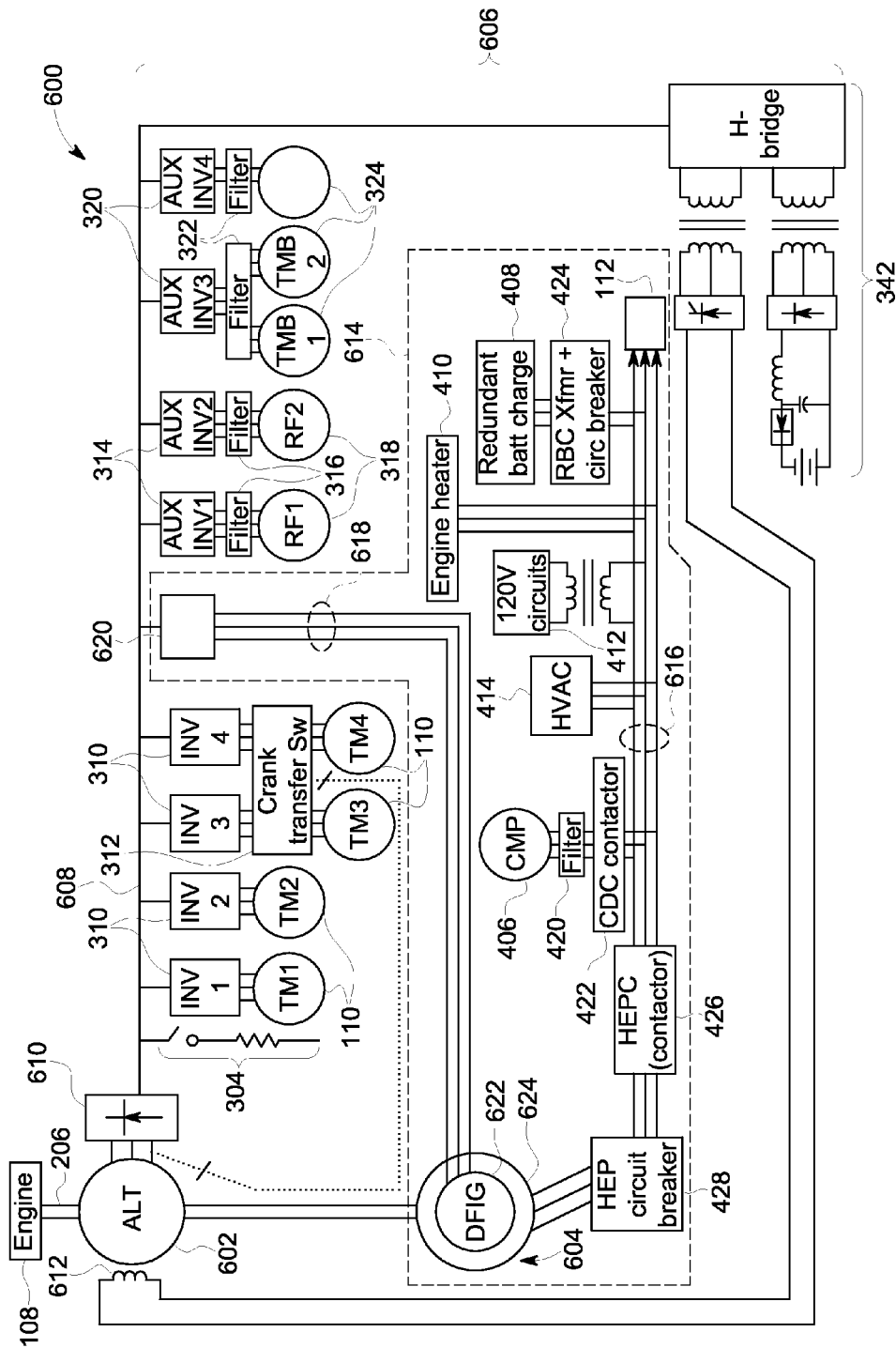
FIG. 6 is a power distribution system of the powered vehicle shown in FIG. 1 in accordance with another embodiment.

FIG. 6 is a power distribution system 600 in accordance with another embodiment. The power distribution system 600 distributes current to propulsion electric loads and non-propulsion electric loads 112, 118 (shown in FIG. 1) of the rail vehicle 100 (shown in FIG. 1) from an alternator 602 ("ALT") and a generator 604 ("DFIG") that are joined to the engine 108. For example, both the alternator 602 and the generator 604 may be joined to the shaft 206 of the engine 108. The alternator 602 and the generator 604 create electric current based on common movement of the shaft 206. The alternator 602 produces current for propulsion electric loads of a tractive circuit 606 and the generator 604 produces current for non-propulsion electric loads 112, 118 of an auxiliary circuit 614. For example, similar to as described above in connection with the tractive circuits 114, 504 (shown in FIGS. 1 and 5), the current generated by the alternator 602 is supplied to a bus 608 that delivers the current to various propulsion electric loads along the tractive circuit 606, including grid resistor legs 304, inverters 310, 314, 320, fraction motors 110, switches 312, filters 316, 322, fans 318, blowers 324, field control component 342, and the like.

The alternator 602 generates electric current that is supplied to the tractive circuit 606 along the bus 608. The current may be generated as alternating current and converted to direct current by a rectifier 610. The voltage of the field current supplied to field windings 612 of the alternator 602 may be varied based on the speed of the engine 108 in order to compensate for changing speeds of the engine 108, as described above.

The auxiliary circuit 614 includes a bus 616 that transmits current produced by the generator 604 to the non-propulsion electric loads 112, 118 (shown in FIG. 1) of the lead powered unit 102 (shown in FIG. 1) and/or trailing cars 104 (shown in FIG. 1). For example, the auxiliary circuit 614 may supply current from the generator 604 to non-propulsion electric loads 112, 118 such as the HVAC subsystem 414, the electric circuits 412, the battery charger 408, the contactor 426, the compressor 406, and other non-propulsion electric loads 118 in the trailing cars 104, as described above.

In the illustrated embodiment, the tractive and auxiliary circuits 606, 614 are electrically coupled with each other in a non-transformed manner. For example, electric current may be conveyed between the tractive and auxiliary circuits 606, 614 not through or across a transformer, but along a conductive pathway or bus 618 that is joined to and extends between the tractive and auxiliary circuits 606, 614. The current produced by the alternator 602 and conveyed along the bus 608 is supplied to a HEP inverter 620. Alternatively, the HEP inverter 620 may receive current from a power source other than the alternator 602, such as a power source that is decoupled from the alternator 602. For example, the HEP inverter 620 may receive current from a battery or the bus 616 of the auxiliary circuit 614. The HEP inverter 620 converts the direct current on the bus 608 to an alternating current that is transmitted along the bus 618 to the generator 604.

The generator 604 is a double-fed induction generator in the embodiment shown in FIG. 6. For example, the generator 604 may be an induction generator that includes field (or rotor) windings 622 and stator windings 624. The field windings 622 receive a field current from the HEP inverter 620 to create a magnetic field. In the illustrated embodiment, the field windings 622 receive a multiphase alternating current from the HEP inverter 620, such as a three phase current, to create the magnetic field of the generator 604. The field windings 622 are joined with the shaft 206 and move based on movement of the shaft 206. The movement of the field windings 622 generates an electric current that is output from the generator 604. The current that is output by the generator 604 may be an alternating current that is delivered to the bus 616 of the auxiliary circuit 614 in order to power the non-propulsion electric loads 112, 118 (shown in FIG. 1), such as the compressor 406, HVAC subsystem 414, electric circuits 412, battery charger 408, and the like.

The frequency and/or magnitude of the current that is output from the generator 604 may be based on the field current that is supplied to the field windings 622 by the HEP inverter 620. The HEP inverter 620 changes the frequency and/or magnitude of the output current by varying the frequency and/or magnitude of the field current that is transmitted to the field windings 622. In one embodiment, the HEP inverter 620 may base the voltage of the field current on the speed of the engine 108. For example, the HEP inverter 620 may vary the voltage that is applied to the field windings 622 in order to provide an output current from the generator 604 having a predetermined voltage that is independent of the speed of the engine 108. When the engine 108 slows down rotation of the shaft 206, the HEP inverter 620 may increase the voltage applied to the field windings 622 so that the voltage that is output from the generator 604 remains within a determined range. Conversely, when the engine 108 speeds up, the HEP inverter 620 may decrease the voltage applied to the field windings 622 such that the voltage of the output current from the generator 604 remains in the determined range of voltages. In one embodiment, the determined range of voltages includes about 475 volts. For example, the determined range may extend between 450 and 500 volts.

The HEP inverter 620 may base the frequency of the field current that is applied to the field windings 622 in response to changing speeds of the engine 108 and/or changing frequency demands of the auxiliary circuit 614. For example, the HEP inverter 620 may change the frequency of the field current in order to provide an output current from the generator 604 a predetermined frequency or a frequency that falls within a predetermined range of frequencies. The generator 604 produces electric current having a base frequency that is dependent on movement of the engine 108 and the frequency of the field current. When the engine 108 slows down rotation of the shaft 206, the HEP inverter 620 may increase the frequency of the field current so that the base frequency of the output current from the generator 604 is increased and the output current has a frequency within a determined range of frequencies. Conversely, when the engine 108 speeds up, the HEP inverter 620 may decrease the frequency of the field current such that the base frequency is reduced and the frequency of the output current remains in the determined range of frequencies. In one embodiment, the frequency of the field current modifies the frequency of the output current by the same amount. For example, a field current having a frequency of 10 Hz would increase the frequency of the output current by 10 Hz from the base frequency. A field current having a frequency of −10 Hz would decrease the frequency of the output current by 10 Hz from the base frequency. If the frequency of the output current is within the determined range of frequencies at a current speed of the engine 108, then the HEP inverter 620 may supply a direct current to the as the field current. For example, the HEP inverter 620 may deliver a current having no frequency if the speed of the engine 108 is sufficient to generate an output current from the generator 604 that falls within the determined range of frequencies.

By way of example only, if the engine 108 is operating at a speed of 900 rpm, then the operating speed of the engine 108 is sufficient to cause the generator 604 to output a current of 480 volts and 60 Hz with a direct current voltage having a frequency of 0 Hz applied to the field windings 622. If the engine 108 slows down to a speed of 750 rpm, then the HEP inverter may increase the voltage and/or the frequency of the field current. For example, at a speed of 750 rpm, the engine may cause the generator to create an output current of 480 volts and 50 Hz if the frequency of the field current is not modified. In such a situation, the HEP inverter may apply the field current at a frequency of 10 Hz in order to increase the output current to the determined 60 Hz frequency. In another example, at a speed of 1050 rpm, the engine may cause the generator to create an output current of 480 volts and 70 Hz if the frequency of the field current is not modified. In such a situation, the HEP inverter 620 may apply the field current at a frequency of −10 Hz in order to decrease the output current to the determined 60 Hz frequency. While a 60 Hz current is output from the generator in the above examples, alternatively the generator may produce a current having a different frequency. For example, the generator may output a lower frequency current.

The use of a variable frequency and voltage HEP inverter 620 may reduce the weight of the power distribution system 600 when compared to other power distribution systems. For example, the use of a variable frequency HEP inverter 620 may allow the HEP inverter 620 to supply a non-filtered alternating current as the field current to the generator 604. As a result, the variable frequency HEP inverter 620 may avoid the need for filters between the HEP inverter 620 and the generator 604 that remove unwanted frequencies. Such filters can be relatively heavy and reducing the need for such filters reduces the weight of the system 600. Additionally, the alternator 620 may have a relatively low power rating when compared to other inverters used in power distribution systems for rail vehicles. The lower power rating can result in an inverter 620 that is lighter when compared to inverters having higher power ratings.

The speed at which the engine 108 operates may be controlled in order to provide sufficient power for the tractive circuit 606 to propel the rail vehicle 100 (shown in FIG. 1) and to enable the HEP inverter 620 and generator 604 to produce sufficient power for the auxiliary circuit 614. As the power demand of the tractive and auxiliary circuits 606, 614 increases, the engine 108 may need to increase the speed at which the shaft 206 is rotated to meet the increased power demand. Conversely, as the power demand of the tractive and auxiliary circuits 606, 614 decreases, the engine 108 may slow down. The generator 604 may supply power to the tractive circuit 606 when the engine 108 is operating at relatively slow speeds. For example, the generator 604 may create electric current that is fed to the tractive circuit 606 through the HEP inverter 620 when the engine 108 is operating at an idling speed or another relatively low speed.

In one embodiment, the vehicle 100 (shown in FIG. 1) may include a regenerative braking system that creates current when the vehicle 100 slows down or brakes. As described above, this regenerated current may be delivered to the generator 604 by way of the HEP inverter 620 as the rotor current that is input to the generator 604. For example, when the engine 108 is operating at a speed of 750 rpm, approximately one-sixth of the electric power obtained from the regenerated current is supplied to the generator 604 as the rotor current from the tractive circuit 606.

Another embodiment relates to a power distribution system for a vehicle. The system comprises a propulsion alternator, a first bus, an HEP alternator, and a second bus. The propulsion alternator is coupled to an engine of the vehicle. The first bus is joined with the propulsion alternator and electrically couples the propulsion alternator with a propulsion electric load that propels the vehicle. The HEP alternator is joined to the engine. The second bus is coupled with the HEP alternator and electrically joins the HEP alternator with a non-propulsion electric load of the vehicle. The propulsion alternator and HEP alternator separately generate electric currents to power the propulsion electric load and the non-propulsion electric load, respectively. That is, the propulsion alternator generates a first electric current (transmitted over the first bus) to power the propulsion electric load, and the HEP alternator generates a second, separate electric current (transmitted over the second bus) to power the non-propulsion electric load. The HEP alternator and the second bus are electrically separate from the propulsion alternator and the first bus. As used in describing this embodiment and all the other embodiments herein, the terms "join" and "couple" are used interchangeably to refer to a mechanical and/or electrical connection, as applicable.

In another embodiment, the power distribution system further comprises a field control component electrically joined with the HEP alternator by the second bus. The field control component reduces a voltage of the second electric current transmitted along the second bus to be approximately equivalent to a voltage demand of the non-propulsion electric load. In one embodiment, "approximately" equivalent means within 10% of a value. For example, the voltage of the second electric current may be approximately equivalent to the voltage demand of the non-propulsion electric load when the voltage of the second electric current is within 10% of the voltage demand. Alternatively, the voltage of the second electric current may be approximately equivalent to the voltage demand when the voltage of the second electric current is within a different percentage of the voltage demand, such as within 5%, 20%, or 55%.

Another embodiment relates to a power distribution system for a vehicle. The system comprises an alternator, a bus, and a HEP motor/generator set. The alternator is coupled to an engine of the vehicle and generates electric current based on movement of the engine. The bus receives the electric current from the alternator and supplies the electric current to a propulsion electric load that propels the vehicle. The HEP motor/generator set is coupled with the bus, and includes a HEP motor powered by the electric current from the bus and a generator joined with the HEP motor. The generator creates electric current for an auxiliary circuit based on movement of the HEP motor to power a non-propulsion electric load of the auxiliary circuit.

Another embodiment relates to a power distribution system for a vehicle. The system comprises an alternator and a generator. The alternator is coupled to an engine of the vehicle. The alternator generates a first electric current for a propulsion electric load of the vehicle based on movement of the engine. The generator is coupled to the engine and includes field windings that receive a field current to generate a magnetic field. The generator creates a second electric current to power a non-propulsion electric load of the vehicle. The second electric current created by the generator is based on movement of the engine and the field current.

Another embodiment relates to a vehicle that includes an engine having a primary output shaft, a propulsion alternator, and an alternator. The propulsion alternator and alternator are commonly mechanically connected to the primary output shaft of the engine, such that when the primary output shaft is rotated or turned through operation of the engine, the propulsion alternator creates a first electrical current, and the alternator separately creates a second electrical current. In one aspect, the first current may be supplied to a first bus for powering a propulsion electric load of the vehicle, and the second current may be supplied to a second bus for powering a non-propulsion electric load of the vehicle, where the alternator and the second bus are electrically separate or isolated from the propulsion alternator and the first bus.

In an embodiment, the propulsion alternator and tractive circuit are rated at a first high power level, specifically, from 2500 kilowatts to 3500 kilowatts, and the alternator (and/or motor-generator set 522 and/or generator 604) and auxiliary circuit are also rated at a second high power level, specifically, from about 500 kilowatts to about 1,000 kilowatts.

Figure 7:
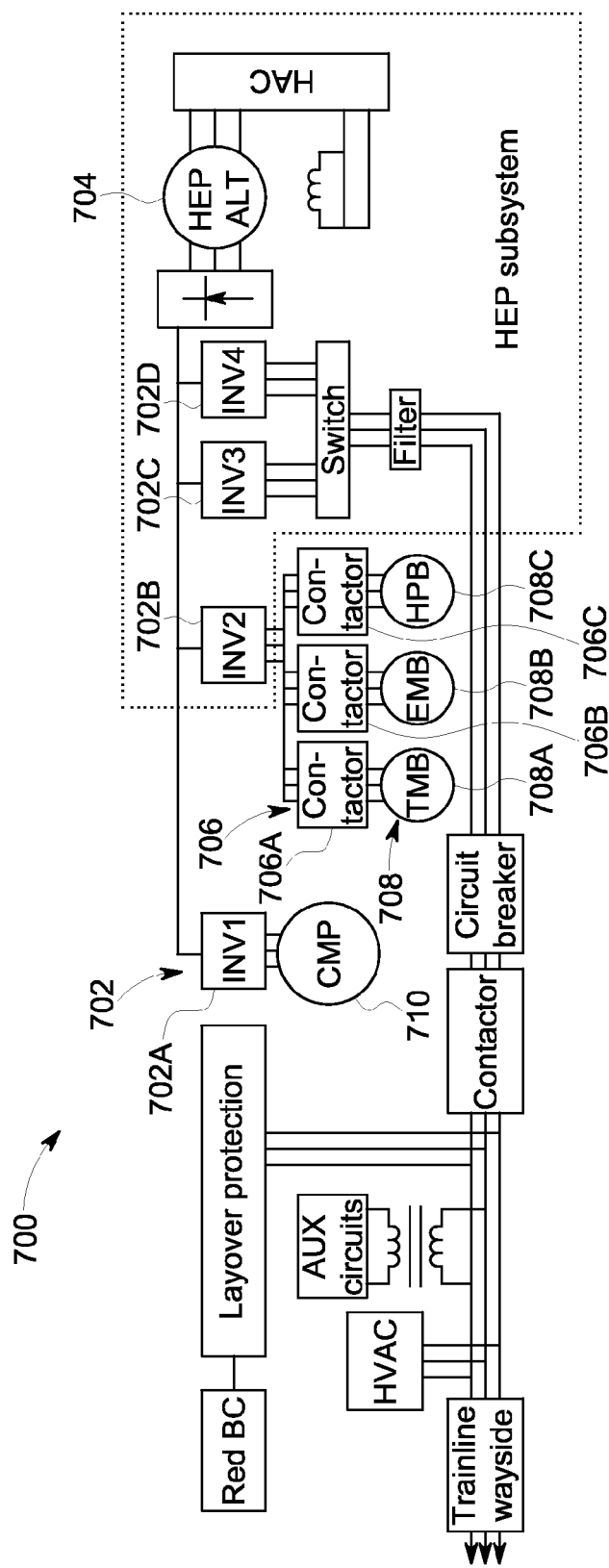
FIG. 7 is a power distribution system of the powered vehicle shown in FIG. 1 in accordance with another embodiment.

FIG. 7 illustrates one example of an auxiliary or HEP circuit 700 that can be used in conjunction with a traction motor circuit (not shown, but may be similar to the circuit 114) such as described herein above. In the illustrated embodiment, there are four inverters 702 shown (e.g., INV1 or 702A, INV2 or 702B, INV3 or 702C, and INV4 or 702D) coupled to a HEP alternator 704 (e.g., the HEP alternator 204, alternator 502, 602, or the like). Alternatively, a different number of one or more inverters 702 may be provided. There is a contactor 706 (e.g., contactors 706A-C) shown between the inverter 702B and each of several loads 708 (e.g., traction motor blower, or TMB, 708A; exhaust motor blower, or EMB, 708B; and HEP power electronics blower, or HPB, 708C) for the inverter 702B. Inverter INV1 is shown without a contactor, but may have one in an optional embodiment. The inverter INV1 drives a compressor 710 as a load. Inverter INV2 drives all of the traction motor blower TMB, exhaust blower EMB, and HEP power electronics blower HPB. An alternator blower ABV (not shown) may have a separate inverter and is coupled to the traction motor bus.

With regard to the inverter INV2, and the multiple loads 708 supported by the inverter INV 2 for the TMB 708A, EMB 708B, and HPB 708C, these various loads differ in horse power requirements. For example, two or more, or all, of the loads 708A, 708B, 708C may require different horse power at the same time. The horse power requirements of the loads 708 may be selected to sum to an inverter capacity of the inverter INV2 at peak use of each load 708. In an alternative embodiment, the functions of the loads 708 connected to the single inverter INV2 are selected so that, at any point in time, the cumulative load from the functions is at the capacity of the single inverter INV2. That is, the loads can be selected such that one or more of the loads can never logically be present when another of the loads is present (so that their combined sums are greater than the capacity of the inverter). The contactor and/or logic functions (described further hereinbelow) act as a further failsafe to protect the inverter from overload.

Figure 8:
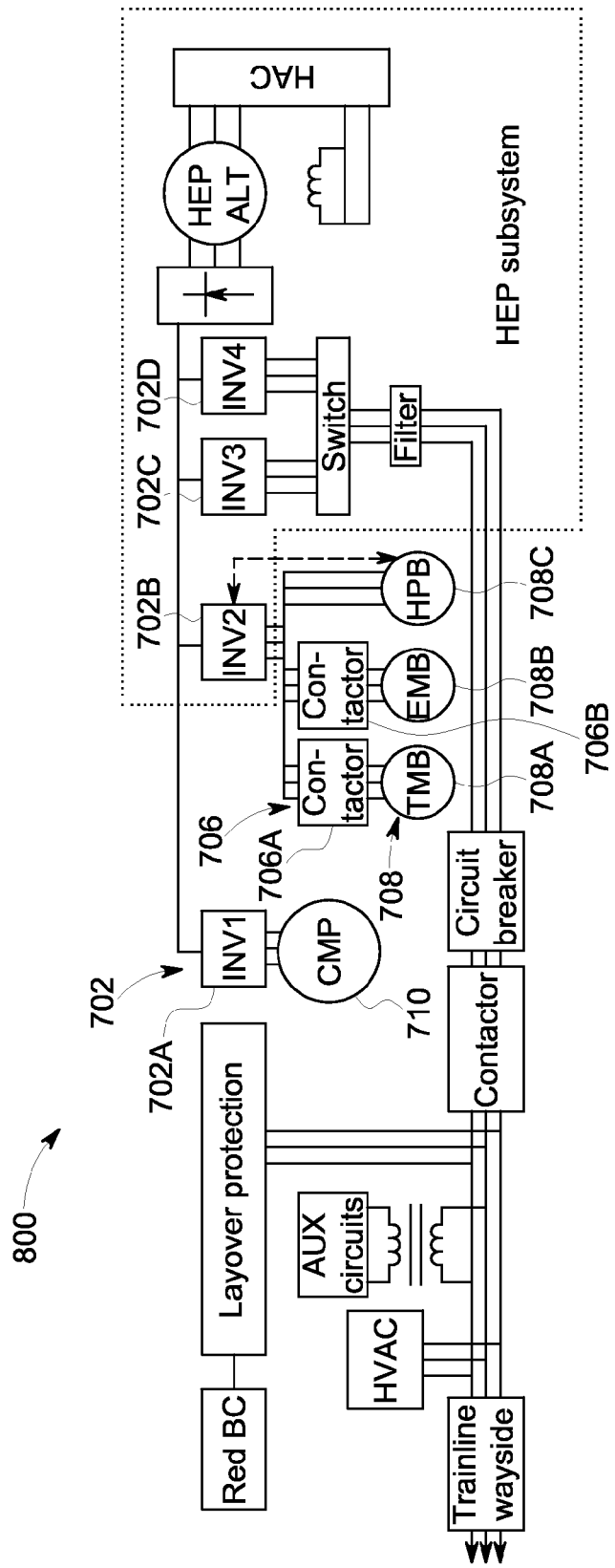
FIG. 8 is a power distribution system of the powered vehicle shown in FIG. 1 in accordance with another embodiment.

FIG. 8 illustrates one example of an auxiliary or HEP circuit 800 that is used in conjunction with a traction motor circuit (not shown, but may be similar to the circuit 114), such as described herein above. The circuit 800 shown in FIG. 8 differs from the circuit 700 shown in FIG. 7 in that the contactor 706C between the inverter INV2 and the HEP power electronics blower HPB in the circuit 700 is removed from the circuit 800. An information channel 802 is provided between the HPB 708C and the inverter INV2. Logic controllers coupled thereto (not shown) are capable of switching the HPB 708C on/off as needed.

Figure 9:
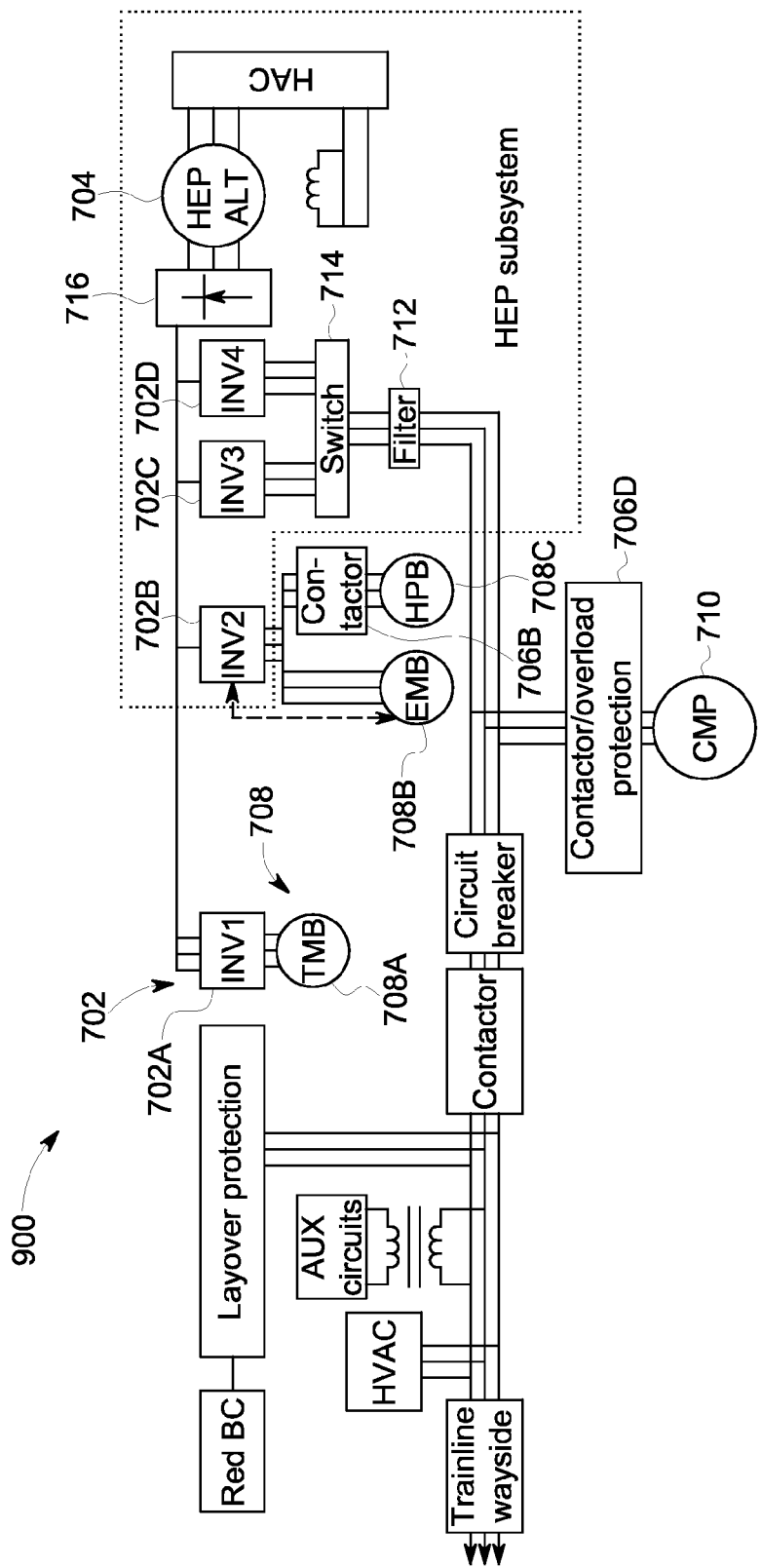
FIG. 9 is a power distribution system of the powered vehicle shown in FIG. 1 in accordance with another embodiment.

FIG. 9 illustrates one example of an auxiliary or HEP circuit 900 that is used in conjunction with a traction motor circuit (not shown, but may be similar to the circuit 114) such as described herein above. The circuit 900 shown in FIG. 9 differs from the circuit 800 shown in FIG. 8 in that the compressor 710 is driven direct from a filter 712 coupled to the inverters INV3 and INV4. For example (and as shown in FIGS. 7 and 8), the inverters INV3 and INV4 may both be conductively coupled with a switch 714, which is conductively coupled with the filter 712. In the circuit 800, another contactor 706D ("Contactor/Overload protection") is disposed between the filter 712 and the compressor 710. Also, a logic communication port can couple the exhaust blower 708B to the inverter INV2 (instead of the contactor 706B disposed between the inverter INV2 and the EMB 708B). The traction motor blower TMB has the inverter INV1 between the traction motor blower TMB and a rectifier 716 (as shown in FIGS. 7, 8, and 9) and the HEP alternator 704. Additional auxiliary functions, such as the radial fans and any inverter blowers may be coupled to the traction motor alternator and bus (not shown), along with their corresponding inverter(s) as needed.

Figure 10:
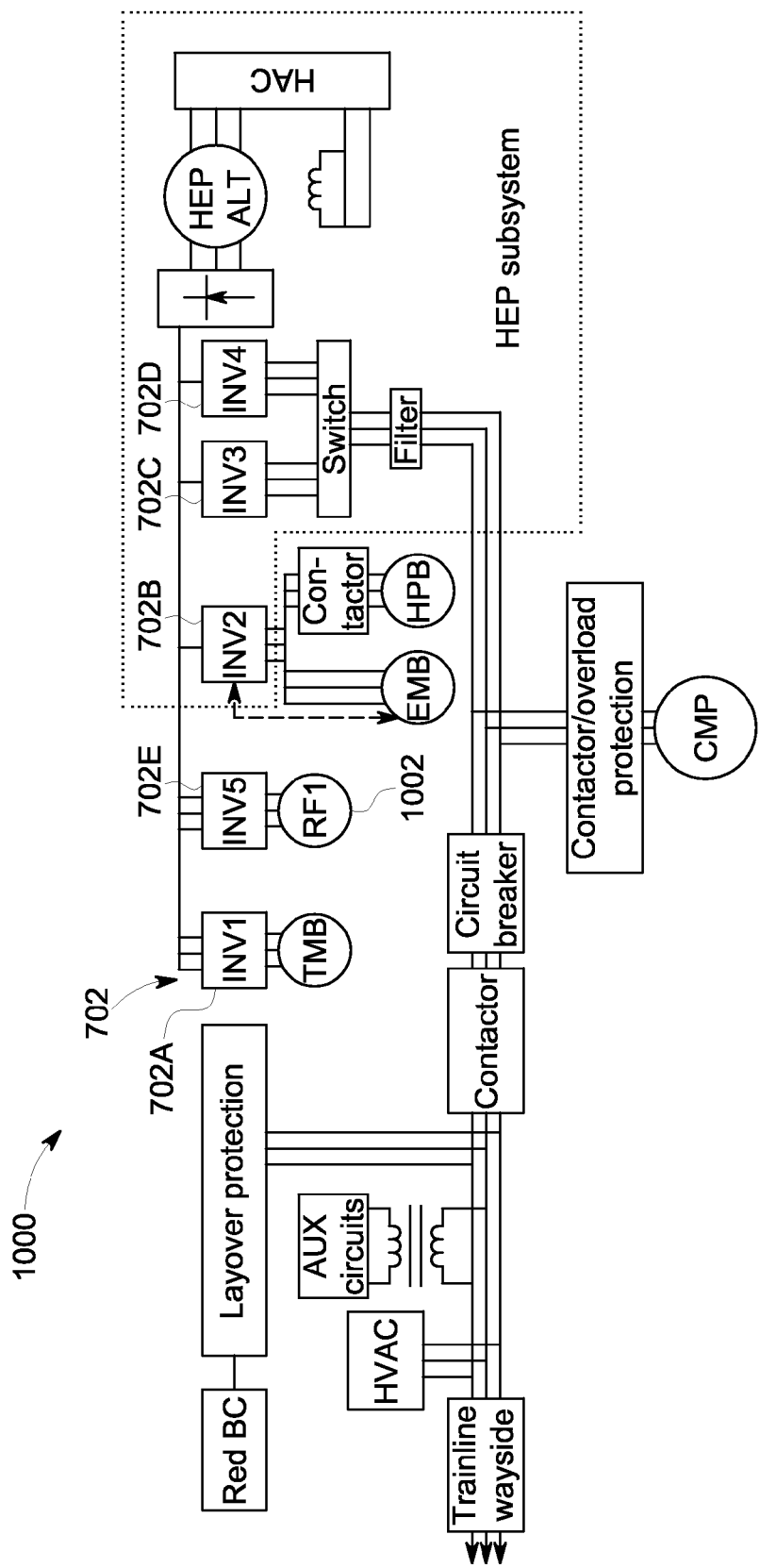
FIG. 10 is a power distribution system of the powered vehicle shown in FIG. 1 in accordance with another embodiment.

FIG. 10 illustrates one example of an auxiliary or HEP circuit 1000 that is used in conjunction with a traction motor circuit (not shown, but may be similar to the circuit 114) such as described herein above. The circuit 1000 differs from the circuit 900 shown in FIG. 9 in that an additional inverter INV5 702E couples to a radial fan RF1 1002 (with an optional second radial fan RF2 (not shown) coupled to the traction motor bus.

Figure 11:
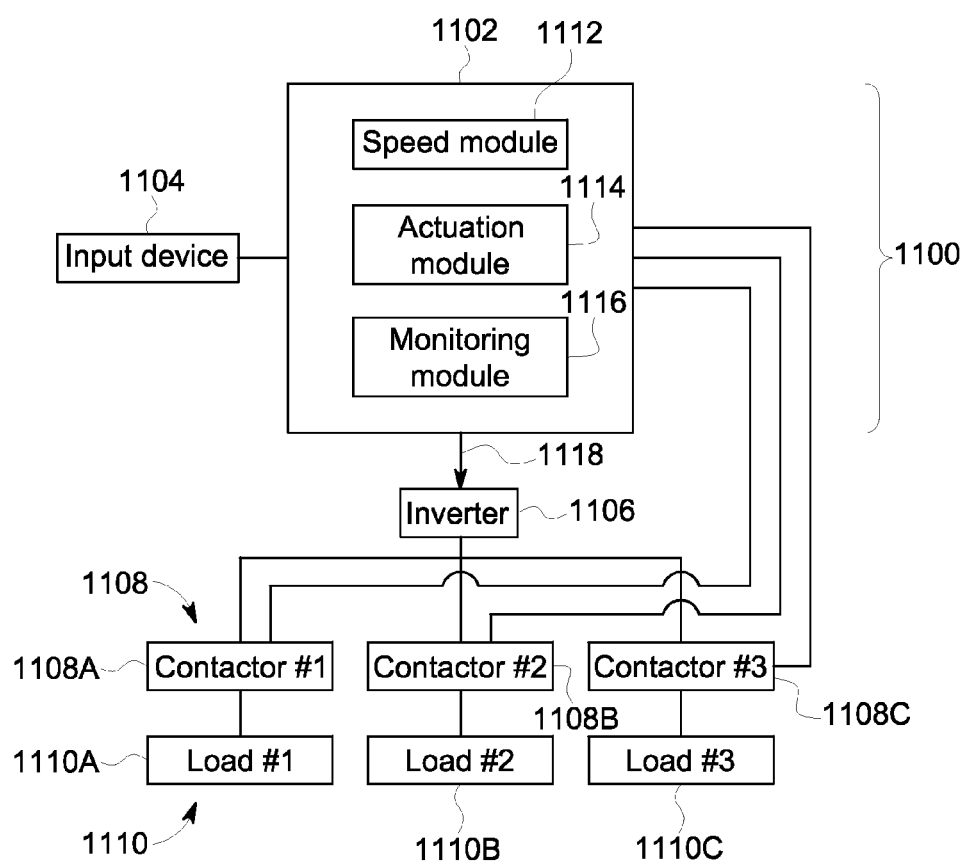
FIG. 11 illustrates a schematic diagram of one embodiment of a control system.

FIG. 11 illustrates a schematic diagram of one embodiment of a control system 1100. The control system 1100 may be used to control operations of one or more of the circuits described herein, such as the circuits 700, 800, 900, and/or 1000 shown in FIGS. 7 through 10. In one embodiment, the control system 1100 controls the speed at which one or more of the inverters 702 operate and/or controls operational states of the contactors 706 (e.g., whether the contactors 706 are in an open or closed state). The inverters 702 that are controlled by the control system 1100 may be connected in a one-to-many arrangement or circuit with loads, such as the loads 708. For example, a single inverter 702 may be connected with and supply current to two or more loads 708, two inverters 702 may be connected with and supply current to three or more loads 708, and the like. The control system 1100 can control the speed of the inverters 702 and/or the operational states of the contactors 706 disposed between the inverters 702 and the loads 708 in order to individually control which loads 708 are powered by the inverters 702.

In the illustrated embodiment, the control system 1100 includes a controller 1102 and an input device 1104. The controller 1102 includes several modules 1112, 1114, 1116 that perform various operations. As used herein, the controller 1102 and/or modules 1104 can include or represent a hardware and/or software system that operates to perform one or more functions. For example, the controller 1102 and/or modules 1112, 1114, 1116 may include one or more computer processors, controllers, and/or other logic-based devices that perform operations based on instructions stored on a tangible and non-transitory computer readable storage medium, such as a computer memory. Alternatively, the controller 1102 and/or modules 1112, 1114, 1116 may include a hard-wired device that performs operations based on hard-wired logic of a processor, controller, or other device. The controller and/or modules shown in the attached figures may represent the hardware that operates based on software or hardwired instructions, the software that directs hardware to perform the operations, the computer readable storage medium having the instructions that direct one or more operations, or a combination thereof. The input device 1104 can represent a keyboard, button, switch, lever, touchscreen, stylus, electronic mouse, pedal, or other apparatus that can be used by an operator to provide input and manually control operations of the controller 1102. Alternatively or additionally, the input device 1104 can represent another component of a system that autonomously provides input to the control system 1100 in order to automatically control operations of the control system 1100.

The controller 1102 is shown connected to a single inverter 1106 in the illustrated embodiment, alternatively, the controller 1102 may be connected with two or more inverters and operate as described herein. Additionally, while the inverter 1106 is shown connected to three loads 1110 (e.g., loads 1110A-C) via three contactors 1108 (e.g., contactors 1108A-C), alternatively, the inverter 1106 may be connected to two or more loads 1110 via two or more contactors 1108. In another embodiment, the controller 1102 may be connected to two or more inverters 1106 that are collectively connected with two or more loads 1110 (e.g., all of the two or more inverters 1106 supply power to the two or more loads 1110).

The inverter 1106 can represent one or more of the inverters 702 shown in FIGS. 7-10, such as the inverter 702B shown in FIGS. 7 and 8. The contactors 1108 can represent one or more of the contactors 706 shown in FIGS. 7-10, such as the contactors 706A-C shown in FIG. 7. The loads 1110 can represent one or more of the loads 708 shown in FIGS. 7-10, such as the TMB 708A, the EMB 708B, and the HPB 708C shown in FIG. 7.

The modules 1112, 1114, 1116 of the controller 1102 monitor the speed at which the inverter 1106 operates, control the speed at which the inverter 1106 operates, and/or control when the various contactors 1108 are open or closed in order to individually control which of the loads 1110 are powered by the inverter 1106 and which loads 1110 are not powered by the inverter 1106. For example, the controller 1102 can control the inverter 1106 and contactors 1108 such that all loads 1110 are powered during a first time period; the loads 1110A, 1110B are powered while the load 1110C is not powered during a subsequent, second time period; the loads 1110B, 1110C are powered while the load 1110A is not powered during a subsequent, third time period; the load 1110A is powered while the loads 1110B, 1110C are not powered during a subsequent, fourth time period, and the like.

The modules of the controller 1102 include a speed module 1112 that controls the speed at which the inverter 1106 operates. The speed at which the inverter 1106 operates can represent the rate or frequency at which one or more switches of the inverter 1106 operate. The speed module 1112 can output a speed control signal 1118 to the inverter 1106. The speed control signal 1118 can be communicated through a wired and/or wireless connection. The signal 1118 can direct the inverter 1106 to operate at a designated speed, such as a designated rate or frequency.

An actuation module 1114 controls which of the contactors 1108 are in an open state or a closed state. In the open state, the contactor 1108 blocks the conduction of power (e.g., electric current) from the inverter 1106 to the load 1110 that is connected to the inverter 1106 by the contactor 1108. In the closed state, the contactor 1108 conducts the power from the inverter 1106 to the load 1110 that is connected to the inverter 1106 by the contactor 1108.

A monitoring module 1116 determines or predicts the speed at which one or more of the loads 1110 will operate when the inverter 1106 is switched off by the controller 1102. The monitoring module 1116 can estimate the speed of the loads 1110 in order to prevent or avoid damaging the contactors 1108 when one or more of the contactors 1108 is switched from a closed state to an open state. For example, if a load 1110 is operating at too fast of a speed (e.g., a speed that exceeds a designated speed threshold associated with a contactor 1108 and/or the load 1110 that is connected to the inverter 1106 via the contactor 1108) when the contactor 1108 switches to an open state, the continued movement of the load 1110 can cause electrical arcing between contacts of the contactor 1108. This arcing can damage the contactor 1108 such that the contactor 1108 is prevented from returning to a closed state. This can prevent continued use of the load 1110 that is connected to the contactor 1108.

In one embodiment, the monitoring module 1116 can use an inertial model to estimate the speed at which the TMB (e.g., load 1110A), the EMB (e.g., the load 1110B), and/or the HPB (e.g., the load 1110C) is operating (e.g., the speed at which fan blades or turbines are rotated by the motors of the TMB, EMB, and/or HPB). Such an inertial model can estimate the speed of one or more of the loads 1110 based on the speed of the load 1110 when the inverter 1106 is turned off (e.g., by correlating the voltage and/or frequency of the current that is supplied to the loads 1110 with previously measured speeds of the loads 1110), the mass and/or size of the loads 1110 and/or components of the loads 1110 (e.g., the fan blades or turbine blades of the loads 1110), and/or other factors. The inertial model can be based on one or more relationships associated with these factors, such as the following relationship:

$$\frac{d(I\omega)}{dt} = \sum_{j=1}^{N} T_j \qquad \text{(Eqn. \#1)}$$

where I represents a central intertia tensor (e.g., the moment of inertia) of the load 1110 and/or one or more components of the load 1110, $\omega$ represents an angular velocity vector of the load 1110 and/or one or more components of the load 1110, and T represents the moment of the $j^{th}$ external force on the load 1110 and/or one or more components of the load 1110 about a mass center of the load 1110 and/or the one or more components. The inertial model can be used to predict the speeds of the load 1110 as the load 1110 gradually slows down over time due to the inverter 1106 being switched off.

Alternatively or additionally, the monitoring module 1116 can use one or more sensors (not shown) that are operatively connected with a load 1110 to estimate the speed of the load 1110 after turning the contactor 1108 off. For example, an air flow sensor and/or pressure sensor may be disposed in a location so that the sensors can measure the airflow generated by the load 1110. The monitoring module 1116 can associate different airflows and/or pressures with different speeds of the load 1110, such as from previous measurements and/or calibrations. By tracking changes in the airflow and/or pressure changes after the inverter 1106 is turned off, the monitoring module 1116 can estimate the speed of the load 1110. A speed sensor may be joined with the load 1110 to measure the actual speed of the load 1110. For example, a rotational speed sensor can provide the rotating speed of the load 1110 after the inverter 1106 is turned off to the monitoring module 1116.

Alternatively or additionally, the monitoring module 1116 can associate different speeds of the load 1110 with different time periods following the time at which the inverter 1106 is turned off. For example, during previous measurements or calibrations, the speed of the load 1110 can be measured at different times following when the inverter 1106 is turned off. The monitoring module 1116 can use these measured speeds to predict how fast the load 1110 is operating after turning the inverter 1106 off.

In operation, the controller 1102 controls the speed of the inverter 1106 and/or the operating state of the contactors 1108 in order to individually control which loads 1110 are turned off or on. The controller 1102 can receive instructions to turn off one or more loads 1110 from the input device 1104. The controller 1102 can then slow down the speed of the inverter 1106, such as to a speed that is less than a designated speed threshold of the inverter 1106. The controller 1102 can slow down the inverter 1106 relatively rapidly so that the loads 1110 that are to remain on and powered by the inverter 1106 do not experience a significant decrease in the power supplied to the loads 1110 by the inverter 1106. For example, the speed module 1112 can direct the inverter 1106 to slow from a speed that is greater than the speed threshold of the inverter 1106 to a speed that is no greater than the speed threshold of the inverter 1106 within a fraction (e.g., less than one) of a second. Alternatively, the inverter 1106 may slow down over a longer time period, such as within seconds (e.g., less than 10 seconds).

Once the inverter 1106 has slowed to a speed below the speed threshold, the inverter 1106 may continue to operate at a non-zero speed that is less than the speed threshold when the actuation module 1114 opens the contactors 1108 connected to the loads 1110 that are to be turned off. For example, if input from the input device 1104 directs the load 1110A to be turned off while the other loads 1110B, 1110C remain on, the actuation module 1114 can open the contactor 1108A when the inverter 1106 slows down, but keep the contactors 1108B, 1108C closed. Once the contactor 1108A is opened, the load 1110A is no longer powered by the inverter 1106. The speed module 1112 can then direct the inverter 1106 to speed back up, such as to a speed that exceeds the speed threshold of the inverter 1106. The loads 1110B, 1110C may continue to be powered by the inverter 1106 while the load 1110A remains disconnected from the inverter 1106 by the contactor 1108A.

In another embodiment, the controller 1102 controls whether the inverter 1106 is on or off, and controls the operating state of the contactors 1108 in order to individually control which loads 1110 are turned off or on. The controller 1102 can receive instructions to turn off one or more loads 1110 from the input device 1104. The controller 1102 can then deactivate the inverter 1106, such as by turning the inverter 1106 off or changing an operating state of the inverter 1106 such that the inverter 1106 no longer supplies electric current to the loads 1110 (e.g., no longer converts DC into AC for supply to the loads 1110 via the contactors 1108). The controller 1102 can turn off the inverter 1106 while the contactors 1108 remain in a closed state in order to maintain the connections between the loads 1110 and the inverter 1106.

When the inverter 1106 is off (e.g., deactivated), the monitoring module 1116 can determine the speed at which the load 1110 (that is to be disconnected from the inverter 1106) is operating. As described above, the monitoring module 1116 can estimate the speed of the load 1110 after the inverter 1106 is switched off in one or more ways. When the monitoring module 1116 determines that the predicted or estimated speed of the load 1110 does not exceed a speed threshold associated with the load 1110, then the actuation module 1114 can direct the contactor 1108 connected to the load 1110 to switch from the closed state to the open state.

The speed threshold of the load 1110 may be based on the amount of reverse voltage from the load 1110 that can be handled by the contactor 1108 without damaging the contactor 1108. For example, when the load 1110 is disconnected from the inverter 1106 by the contactor 1108, continued movement of the load 1110 may generate a reverse voltage across the contacts of the contactor 1108. This reverse voltage can cause arcing and damage to the contactor 1108. The speed threshold of the load 1110 may be an operating speed of the load 1110 that is low enough to prevent the reverse voltage from the load 1110 from damaging the contactor 1108.

Once the load 1110 has slowed down (or is estimated to have slowed down) to a speed that is no greater than the speed threshold of the load 1110, the actuation module 1114 opens the contactor 1108 so the load 1110 is decoupled from the inverter 1106. The speed module 1112 may then activate (e.g., turn on) the inverter 1106. The inverter 1106 may then supply current to the other loads 1110 that remain connected to the inverter 1106. For example, if the load 1110B is decoupled from the inverter 1106 by the contactor 1108B when the operating speed of the load 1110B decreases (as described above), then the inverter 1106 may be turned back on to continue to supply current to the loads 1110A, 1110C through the contactors 1108A, 1108C.

Figure 12:
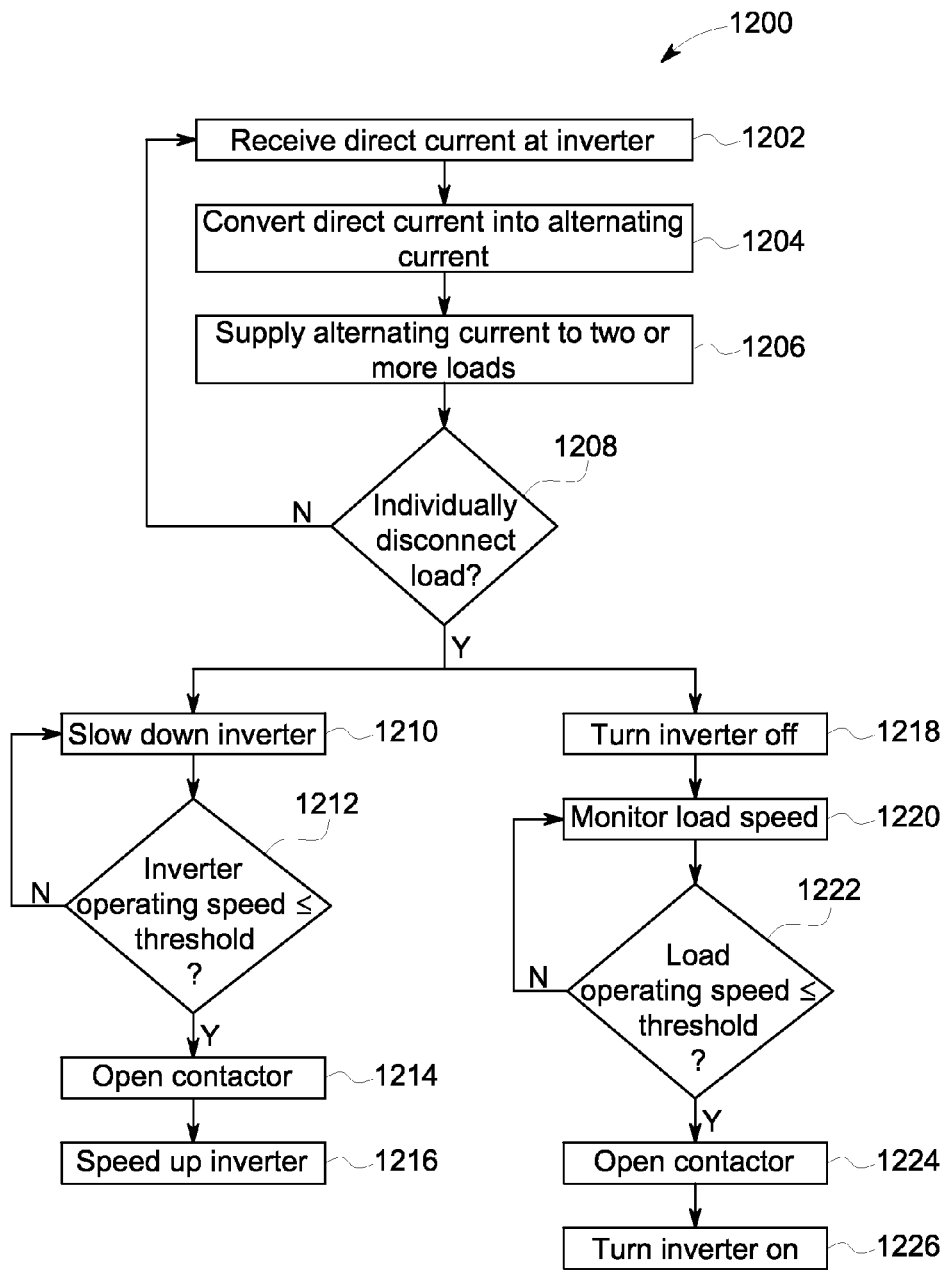
FIG. 12 is a flowchart of one embodiment of a method for controlling multiple inverter-driven loads.

FIG. 12 is a flowchart of one embodiment of a method 1200 for controlling multiple inverter-driven loads. The method 1200 may be used in conjunction with one or more of the systems described herein. For example, the method 1200 may be used to individually control which of several loads connected to the same inverter are powered or not powered by the inverter.

At 1202, direct current is received by an inverter. For example, direct current may be supplied to the inverter via a bus, such as an auxiliary bus or tractive bus. At 1204, the inverter converts this direct current into an alternating current. The inverter can convert the direct current into a three-phase (or other phase) alternating current. The inverter can convert the direct current at an operating speed (e.g., frequency) of the inverter.

At 1206, the alternating current from the inverter is supplied to two or more loads. The alternating current may be supplied via contactors that separately connect the loads to the inverter.

At 1208, a determination is made as to whether one or more of the loads is to be disconnected from the inverter while one or more other loads remain connected to the inverter. A command may be received from an operator to disconnect one or more of the loads from the inverter. Additionally or alternatively, a command may be automatically provided to disconnect one or more of the loads. For example, a sensor or other device may obtain data that indicates a fault in a load that is connected to the inverter. The command to disconnect the load may then be automatically generated and communicated, such as to the controller 1102 (shown in FIG. 11).

If one or more loads are to be disconnected from the inverter, then operations of the inverter may need to be controlled (e.g., modified) to allow the one or more loads to be disconnected, while one or more other loads remain connected with the inverter. In one embodiment of the method 1200, the operations of the inverter may be controlled according to a first path of operations (e.g., operations described in connection with 1210-1216 of FIG. 12). Alternatively, the operations of the inverter may be controlled according to a second path of operations (e.g., operations described in connection with 1218-1226 of FIG. 12). In another embodiment, the operations of the inverter may be controlled according to both the first and second paths of operations.

At 1210, the operating speed of the inverter (e.g., the frequency at which the inverter operates) is decreased. The operating speed can be decreased while the contactors remain closed to maintain connections between the inverter and the loads. At 1212, a determination is made as to whether the operating speed of the inverter is less than or equal to (e.g., no greater than) a first speed threshold. If the operating speed is faster than the first speed threshold, then the inverter may be operating at too great a speed (e.g., too fast of a frequency) to open the contactor connected to the load that is to be disconnected from the inverter. For example, the alternating current being output from the inverter may still be too great and may create arcing across the contacts of the contactor and/or damage the contactor. As a result, flow of the method 1200 can return to 1210. The method 1200 may proceed in a loop-wise manner between 1208 and 1210 until the operating speed of the inverter decreases to be no greater than the first speed threshold.

When the operating speed of the inverter is no greater than the first speed threshold, then the contactor may be opened to disconnect a load from the inverter without causing arcing in the contactor and/or damaging the contactor. As a result, flow of the method 1200 can proceed to 1214.

At 1214, the contactor to which the load (that is to be disconnected) is coupled is opened. For example, the contactor may switch from the closed state to the open state. The other contactors that connect loads to the inverter may remain closed. The contactor that opens causes the load connected to the contactor to be disconnected from the inverter. The other loads remain connected to the inverter via the closed contactors.

At 1216, the operating speed of the inverter is increased. For example, the operating speed may be increased to the speed of the inverter prior to slowing down the inverter, or to another speed. The inverter increases speed in order to continue supplying alternating current to the loads that remain connected to the inverter.

With respect to the second path of the method 1200, at 1218, the inverter is turned off. For example, the inverter may be deactivated such that the inverter no longer converts direct current into an alternating current. At 1220, the operating speed of the load that is to be disconnected from the inverter is monitored. The operating speed may be estimated as described above. Because the load is no longer supplied with current from the deactivated inverter, the operating speed of the load may slow down over time.

At 1222, a determination is made as to whether the operating speed of the load is less than or equal to (e.g., no greater than) a second speed threshold. If the operating speed of the load is faster than the second speed threshold, then the load may still be operating at too great a speed to open the contactor connected to the load. For example, the load may be an inductive load that creates a reverse voltage when disconnected from the inverter. If the operating speed of the load is too fast, the reverse voltage could be applied across transistors of the inverter and/or contactors and cause damage to the transistors. As a result, flow of the method 1200 can return to 1220. The method 1200 may proceed in a loop-wise manner between 1220 and 1222 until the operating speed of the load decreases to be no greater than the second speed threshold.

When the operating speed of the load is no greater than the second speed threshold, then the contactor may be opened to disconnect the load from the inverter without damaging the contactor or inverter. As a result, flow of the method 1200 can proceed to 1224.

At 1224, the contactor to which the load (that is to be disconnected) is coupled is opened. For example, the contactor may switch from the closed state to the open state. The other contactors that connect loads to the inverter may remain closed. The contactor that opens causes the load connected to the contactor to be disconnected from the inverter. The other loads remain connected to the inverter via the closed contactors.

At 1226, the inverter is turned back on (e.g., activated). The inverter may return to converting direct current into alternating current that is supplied to the loads that remain connected to the inverter via the closed contactors.

In one embodiment, both the first and second paths of the method 1200 may be used concurrently. For example, a contactor may not be opened to disconnect a load from the inverter until both the operating speed of the inverter is no greater than the first speed threshold and the operating speed of the load is no greater than the second speed threshold.

The method 1200 also may be used to reconnect a load to the inverter. For example, instead of opening a closed contactor to disconnect the load from the inverter (when the inverter operating speed and/or the load operating speed is sufficiently slow), an open contactor may be closed when the inverter operating speed is sufficiently slow. The inverter may then be switched on and/or sped up to supply power to the recently connected load.

In one embodiment, a system (e.g., a system for controlling multiple inverter-driven loads) includes a controller that is configured to be coupled with an inverter that receives direct current and converts the direct current into an alternating current in order to supply the alternating current to plural loads that are connected to the inverter by plural respective contactors. The controller also is configured to control operations of the inverter and of the contactors in order to individually control which of the loads remain connected to and powered by the inverter and which of the loads are disconnected from the inverter.

In one aspect, the controller includes a speed module that is configured to control an operating speed of the inverter. The speed module also is configured to direct the inverter to at least one of reduce the operating speed of the inverter to a speed that is no greater than a first, non-zero, designated speed threshold or deactivate the inverter in order to control the operations of the inverter.

In one aspect, the controller includes an actuation module configured to control the operations of the contactors by individually controlling which of the contactors are in an open state and which of the contactors are in a closed state.

In one aspect, the actuation module is configured to switch one or more of the contactors to the open state responsive to at least one of an operating speed of the inverter decreasing to a non-zero speed that is no greater than a first designated speed threshold or the inverter being deactivated.

In one aspect, the controller includes a monitoring module that is configured to determine an operating speed of one or more of the loads, and the controller is configured to open one or more of the contactors from a closed state responsive to the operating speed of the one or more of the loads decreasing to a speed that is no greater than a second designated speed threshold.

In one aspect, the monitoring module is configured to estimate the operating speed of the one or more of the loads based on at least one of a current supplied to the one or more of the loads when the inverter is deactivated, an airflow generated by the one or more of the loads, or an air pressure generated by one or more of the loads.

In one aspect, the controller is configured to individually control which of the loads remain connected to and powered by the inverter and which of the loads are disconnected from the inverter by reducing an operating speed of the inverter, opening at least a first contactor of the contactors while keeping at least a second contactor of the contactors closed, and increasing the operating speed of the inverter after the at least a first contactor is opened.

In one aspect, the controller is configured to individually control which of the loads remain connected to and powered by the inverter and which of the loads are disconnected from the inverter by deactivating the inverter, estimating an operating speed of at least a first load of the loads, opening at least a first contactor of the contactors while keeping at least a second contactor of the contactors closed when the operating speed that is estimated is no greater than a speed threshold, and activating the inverter after the at least a first contactor is opened.

In one aspect, the controller is configured to be disposed onboard a vehicle to control the operations of the inverter and of the contactors disposed onboard the vehicle.

In one aspect, the loads include at least one of fans or blowers of a vehicle.

In one embodiment, a method (e.g., for controlling multiple inverter-driven loads) includes receiving direct current at an inverter, converting the direct current into an alternating current that is supplied to plural loads that are connected to the inverter by plural respective contactors, controlling operations of the inverter by at least one of deactivating the inverter or decreasing an operating speed of the inverter, and individually controlling which of the loads remain connected to and powered by the inverter and which of the loads are disconnected from the inverter by opening one or more of the contactors when the inverter is deactivated or the operating speed of the inverter is decreased.

In one aspect, controlling the operations of the inverter includes reducing the operating speed of the inverter to a speed that is no greater than a first, non-zero, designated speed threshold.

In one aspect, individually controlling which of the loads remain connected to and powered by the inverter and which of the loads are disconnected from the inverter includes keeping one or more of the contactors closed while one or more of the contactors are opened.

In one aspect, individually controlling which of the loads remain connected to and powered by the inverter and which of the loads are disconnected from the inverter includes switching one or more of the contactors to the open state responsive to at least one of an operating speed of the inverter decreasing to a non-zero speed that is no greater than a first designated speed threshold or the inverter being deactivated.

In one aspect, the method also includes determining an operating speed of one or more of the loads. Individually controlling which of the loads remain connected to and powered by the inverter and which of the loads are disconnected from the inverter can include opening one or more of the contactors from a closed state responsive to the operating speed of the one or more of the loads decreasing to a speed that is no greater than a second designated speed threshold.

In one aspect, determining the operating speed of the one or more of the loads includes estimating the operating speed of the one or more of the loads based on at least one of a current supplied to the one or more of the loads when the inverter is deactivated, an airflow generated by the one or more of the loads, or an air pressure generated by one or more of the loads.

In one aspect, individually controlling which of the loads remain connected to and powered by the inverter and which of the loads are disconnected from the inverter includes reducing the operating speed of the inverter, opening at least a first contactor of the contactors while keeping at least a second contactor of the contactors closed, and increasing the operating speed of the inverter after the at least a first contactor is opened.

In one aspect, individually controlling which of the loads remain connected to and powered by the inverter and which of the loads are disconnected from the inverter includes deactivating the inverter, estimating an operating speed of at least a first load of the loads, opening at least a first contactor of the contactors while keeping at least a second contactor of the contactors closed when the operating speed that is estimated is no greater than a speed threshold, and activating the inverter after the at least a first contactor is opened.

In one embodiment, a system (e.g., for controlling multiple inverter-driven loads) includes an inverter, first and second contactors, and a controller. The inverter is configured to convert direct current into alternating current. The first and second contactors are configured to be connected with the inverter and are individually controllable between open and closed states. The first and second contactors are configured to conductively couple respective first and second loads with the inverter and to individually control supply of the alternating current to the first and second loads. The controller is configured to control the inverter and the first and second contactors in order to disconnect the first or second load from the inverter while the other of the first and second load remains connected to the inverter by at least one of decreasing an operating speed of the inverter or deactivating the inverter, and opening the first or second contactor that is connected to the first or second load that is to be disconnected from the inverter while the other of the first or second contactor remains closed.

In one aspect, the controller is configured to direct the inverter to at least one of reduce the operating speed of the inverter to a speed that is no greater than a first, non-zero, designated speed threshold before opening the first or second contactor.

In one aspect, the controller is configured to open the first or second contactor responsive to at least one of the operating speed of the inverter decreasing to a non-zero speed that is no greater than a first designated speed threshold or the inverter being deactivated.

In one aspect, the controller is configured to determine an operating speed of the first or second load that is to be disconnected from the inverter. The controller also is configured to open the first or second contactor from the closed state responsive to the operating speed of the first or second load decreasing to a speed that is no greater than a second designated speed threshold.

In one aspect, the operating speed of the first or second load is estimated by the controller based on at least one of a current supplied to the first or second load when the inverter is deactivated, an airflow generated by the first or second load, or an air pressure generated by one or more of the loads.

In one aspect, the controller is configured to individually control which of the first or second loads remains connected to and powered by the inverter and which of the first or second loads is disconnected from the inverter by reducing an operating speed of the inverter, opening the first contactor or the second contactor while keeping the other of the first contactor or the second contactor closed, and increasing the operating speed of the inverter after the first contactor or second contactor is opened.

In one aspect, the controller is configured to individually control which of the first or second loads remains connected to and powered by the inverter and which of the first or second loads is disconnected from the inverter by deactivating the inverter, estimating an operating speed of the first load or the second load, opening the first contactor or the second contactor while keeping the other of the first contactor or the second contactor closed, and activating the inverter after the first contactor or second contactor is opened.

In one embodiment, a system (e.g., for controlling multiple inverter-driven loads) includes a single inverter coupleable to a plurality of loads. Two or more of the plurality of loads have relatively differing power rating, voltage requirement, frequency, or control requirements.

In one aspect, the system also includes a current sensor associated with at least one of the plurality of loads.

In one aspect, the system also includes multiple current sensors associated with respective ones of the plurality of loads.

In one aspect, the system also includes one or more contactors disposed between the inverter and one or more of the plurality of loads.

In one aspect, the system is devoid of and not coupled to a transformer.

In one aspect, two or more blowers having differing horsepower ratings are driven by the single inverter.

In one aspect, the system includes, on a head end power alternator circuit, a compressor is driven by another inverter.

In one embodiment, a system (e.g., for controlling multiple inverter-driven loads) includes an alternator coupled to a compressor and further coupled to a first inverter driving at least one of a plurality of cooling fans.

In one aspect, the system also includes a second inverter operable to drive at least one of the plurality cooling fans.

In one aspect, the second inverter drives at least two or more of the plurality of cooling fans, and the cooling fans have substantially different horsepower relative to each other.

In one aspect, the system also includes a logic controller, and the first inverter is decoupleable from at least one of the one or more cooling fans in response to a signal from the logic controller.

In one aspect, the system also includes an inverter disposed between the compressor and the alternator.

In one aspect, the system also includes additional inverters coupled to the alternator and driving additional loads.

In one embodiment, a vehicle having a first alternator that powers a traction bus and a second alternator that powers a head-end-power circuit is provided. The vehicle includes an inverter coupled to the second alternator and a plurality of loads coupled to the inverter. At least two of the loads in the plurality of loads have significantly differing load characteristics relative to each other.

In one embodiment, a system (e.g., for controlling multiple inverter-driven loads of a vehicle) includes a vehicle platform, a controller, an inverter, plural contactors, and plural electric loads. The vehicle platform (e.g., a chassis or other supporting component of the vehicle) can be a platform for a rail vehicle (e.g., a locomotive), for an off-highway vehicle other than a rail vehicle (e.g., a vehicle that is not designed and/or permitted to travel on public roads, such as mining equipment or mining trucks), a marine vessel, an automobile, or the like. The controller and inverter are disposed on-board the vehicle platform. The contactors also are disposed on-board the vehicle platform and are electrically connected to the inverter. The electric loads are disposed on-board the vehicle platform and are respectively electrically connected to the plural contactors. The inverter is operably coupled to the controller and is configured to receive direct current and convert the direct current into an alternating current in order to supply the alternating current to the plural loads that are respectively connected to the inverter by the plural contactors. The controller is configured to control operations of the inverter and of the contactors in order to individually control which of the loads are connected to and powered by the inverter and which of the loads are disconnected from the inverter. The loads include propulsion-generating loads (such as traction motors), maintaining loads (e.g., loads that perform work to maintain operations of the vehicle within designated constraints, such as fans or blowers that cool the motors, radiators, and the like, in order to maintain the temperatures of the motors, radiators, and the like, within designated temperatures), or auxiliary loads (e.g., loads that do not perform work to propel the vehicle, such as passenger cooling and heating systems, electrical circuits for passenger devices, and the like).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Aspects of the inventive subject matter may be embodied as a system, method, or computer program product. For example, the controller 1100 and/or the modules included therein may be embodied as a tangible system, a process, and/or a computer program product. Accordingly, aspects of the inventive subject matter may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a tangible and non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Higher level programming languages can also be used, such as MATLAB, SIMULINK, and the like. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the inventive subject matter are described herein with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that although one or more embodiments may be described in connection with powered vehicle systems having locomotives with trailing passenger cars, the embodiments described herein are not limited to passenger trains. In particular, one or more embodiments may be implemented in connection with different types of vehicles and other vehicles. For example, one or more embodiments may be implemented with a vehicle that travels on one or more rails, such as single locomotives and railcars, powered ore carts and other mining vehicles, light rail transit vehicles, and the like. Example embodiments of systems and methods for providing and distributing power to propulsion electric loads of a powered unit of a vehicle and to non-propulsion electric loads of the powered unit and/or trailing units, such as passenger cars, are provided. As described below, one or more of these embodiments may provide electric current to the traction motor of the powered unit and to the non-propulsion electric loads of the powered and trailing units without conveying the electric current through a transformer or chopper between the traction motor and the non-propulsion electric loads. At least one technical effect described herein includes a method and system that supplies power for both tractive effort and for non-propulsion auxiliary equipment, such as heating subsystems, cooling subsystems, ventilation subsystems, and the like, in passenger cars without the added weight of a transformer and/or chopper to convey the power to the auxiliary equipment.

The embodiments described herein are examples of articles, systems, and methods having elements corresponding to the elements of the inventive subject matter recited in the claims. This written description may enable those of ordinary skill in the art to make and use embodiments having alternative elements that likewise correspond to the elements of the inventive subject matter recited in the claims. The scope of the inventive subject matter thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A system comprising:
a controller configured to be coupled with an inverter that receives direct current and converts the direct current into an alternating current in order to supply the alternating current to plural loads during a common time period, the loads being connected to the inverter by plural respective contactors, the controller configured to control operations of the inverter and of the contactors in order to individually control which of the loads remain connected to and powered by the inverter and which of the loads are disconnected from the inverter;
wherein the controller is configured to control an operating speed of the inverter and to direct the inverter to at least one of reduce the operating speed of the inverter to no greater than a first, non-zero, designated speed threshold or deactivate the inverter prior to disconnecting one or more of the loads from the inverter; and
wherein the controller is configured to determine an operating speed of one or more of the loads after deactivating the inverter, and the controller is configured to open one or more of the contactors from a closed state responsive to the operating speed of the one or more of the loads decreasing to a speed that is no greater than a second designated speed threshold.

2. The system of claim 1, wherein the controller is configured to control the operations of the contactors by individually controlling which of the contactors are in an open state and which of the contactors are in a closed state.

3. The system of claim 2, wherein the controller is configured to switch one or more of the contactors to the open state responsive to at least one of an operating speed of the inverter decreasing to a non-zero speed that is no greater than a first designated speed threshold or the inverter being deactivated.

4. The system of claim 1, wherein the controller is configured to estimate the operating speed of the one or more of the loads based on at least one of a current supplied to the one or more of the loads when the inverter is deactivated, an airflow generated by the one or more of the loads, or an air pressure generated by one or more of the loads.

5. The system of claim 1, wherein the controller is configured to individually control which of the loads remain connected to and powered by the inverter and which of the loads are disconnected from the inverter by reducing an operating speed of the inverter, opening at least a first contactor of the contactors after reducing the operating speed of the inverter while keeping at least a second contactor of the contactors closed, and increasing the operating speed of the inverter after the at least a first contactor is opened.

6. The system of claim 1, wherein the controller is configured to individually control which of the loads remain connected to and powered by the inverter and which of the loads are disconnected from the inverter by deactivating the inverter, estimating an operating speed of at least a first load of the loads after deactivating the inverter, opening at least a first contactor of the contactors while keeping at least a second contactor of the contactors closed when the operating speed that is estimated is no greater than a speed threshold, and activating the inverter after the at least a first contactor is opened.

7. The system of claim 1, wherein the loads include at least one of fans or blowers of a vehicle.

8. A method comprising:
receiving direct current at an inverter;
converting the direct current into an alternating current that is supplied by the inverter to plural loads during a common time period, the loads being connected to the inverter by plural respective contactors;
controlling operations of the inverter by at least one of deactivating the inverter or decreasing an operating speed of the inverter;
individually controlling which of the loads remain connected to and powered by the inverter and which of the loads are disconnected from the inverter by opening one or more of the contactors when the inverter is deactivated or the operating speed of the inverter is decreased; and
determining an operating speed of one or more of the loads after deactivating the inverter, and wherein individually controlling which of the loads remain connected to and powered by the inverter and which of the loads are disconnected from the inverter includes opening one or more of the contactors from a closed state responsive to the operating speed of the one or more of the loads decreasing to a speed that is no greater than a first designated speed threshold.

9. The method of claim 8, wherein controlling the operations of the inverter includes reducing the operating speed of the inverter to a speed that is no greater than a second non-zero, designated speed threshold.

10. The method of claim 8, wherein individually controlling which of the loads remain connected to and powered by the inverter and which of the loads are disconnected from the inverter includes keeping one or more of the contactors closed while one or more of the contactors are opened.

11. The method of claim 10, wherein individually controlling which of the loads remain connected to and powered by the inverter and which of the loads are disconnected from the inverter includes switching one or more of the contactors to the open state responsive to at least one of an operating speed of the inverter decreasing to a non-zero speed that is no greater than a second designated speed threshold or the inverter being deactivated.

12. The method of claim 8, wherein determining the operating speed of the one or more of the loads includes estimating the operating speed of the one or more of the loads based on at least one of a current supplied to the one or more of the loads when the inverter is deactivated, an airflow generated by the one or more of the loads, or an air pressure generated by one or more of the loads.

13. The method of claim 8, wherein individually controlling which of the loads remain connected to and powered by the inverter and which of the loads are disconnected from the inverter includes reducing the operating speed of the inverter, opening at least a first contactor of the contactors after reducing the operating speed of the inverter while keeping at least a second contactor of the contactors closed, and increasing the operating speed of the inverter after the at least a first contactor is opened.

14. The method of claim 8, wherein individually controlling which of the loads remain connected to and powered by the inverter and which of the loads are disconnected from the inverter includes deactivating the inverter, estimating an operating speed of at least a first load of the loads after deactivating the inverter, opening at least a first contactor of the contactors while keeping at least a second contactor of the contactors closed when the operating speed that is estimated is no greater than a speed threshold, and activating the inverter after the at least a first contactor is opened.

15. A system comprising:
an inverter configured to convert direct current into alternating current that is supplied by the inverter to first and second loads during a common time period;
first and second contactors configured to be connected with the inverter and individually controllable between open and closed states, the first and second contactors configured to conductively couple the first and second loads, respectively, with the inverter and to individually control supply of the alternating current to the first and second loads;
a controller configured to control the inverter and the first and second contactors in order to disconnect the first or second load from the inverter while the other of the first and second load remains connected to the inverter by: at least one of decreasing an operating speed of the inverter or deactivating the inverter; and opening the first or second contactor that is connected to the first or second load that is to be disconnected from the inverter while the other of the first or second contactor remains closed; and
wherein the controller is configured to determine an operating speed of the first or second load that is to be disconnected from the inverter after deactivating the inverter, the controller also configured to open the first or second contactor from the closed state responsive to the operating speed of the first or second load decreasing to a speed that is no greater than a first designated speed threshold.

16. The system of claim 15, wherein the controller is configured to direct the inverter to at least one of reduce the operating speed of the inverter to a speed that is no greater than a second, non-zero, designated speed threshold before opening the first or second contactor.

17. The system of claim 15, wherein the controller is configured to open the first or second contactor responsive to at least one of the operating speed of the inverter decreasing to a non-zero speed that is no greater than a second designated speed threshold or the inverter being deactivated.

18. The system of claim 15, wherein the operating speed of the first or second load is estimated by the controller based on at least one of a current supplied to the first or second load when the inverter is deactivated, an airflow generated by the first or second load, or an air pressure generated by one or more of the loads.

19. The system of claim 15, wherein the controller is configured to individually control which of the first or second loads remains connected to and powered by the inverter and which of the first or second loads is disconnected from the inverter by reducing an operating speed of the inverter, opening the first contactor or the second contactor after reducing the operating speed of the inverter while keeping the other of the first contactor or the second contactor closed, and increasing the operating speed of the inverter after the first contactor or second contactor is opened.

20. The system of claim 15, wherein the controller is configured to individually control which of the first or second loads remains connected to and powered by the inverter and which of the first or second loads is disconnected from the inverter by deactivating the inverter, estimating an operating speed of the first load or the second load after deactivating the inverter, opening the first contactor or the second contactor while keeping the other of the first contactor or the second contactor closed, and activating the inverter after the first contactor or second contactor is opened.

21. The system of claim 1, wherein a first load of the plural loads and a second load of the plural loads are both supplied alternating current from the inverter during a first time period, the controller being configured to open the respective contactor associated with the first load from a closed state such that, during a subsequent second time period, the first load is disconnected from the inverter and the second load remains connected to and powered by the inverter.

* * * * *